US011184731B2

(12) United States Patent
Peters et al.

(10) Patent No.: US 11,184,731 B2
(45) Date of Patent: Nov. 23, 2021

(54) RENDERING METADATA TO CONTROL USER MOVEMENT BASED AUDIO RENDERING

(71) Applicant: QUALCOMM Incorporated, San Diego, CA (US)

(72) Inventors: Nils Günther Peters, San Diego, CA (US); Moo Young Kim, San Diego, CA (US); S M Akramus Salehin, San Diego, CA (US); Siddhartha Goutham Swaminathan, San Diego, CA (US); Isaac Garcia Munoz, San Diego, CA (US); Dipanjan Sen, Dublin, CA (US)

(73) Assignee: Qualcomm Incorporated

( * ) Notice: Subject to any disclaimer, the term of this patent is extended or adjusted under 35 U.S.C. 154(b) by 0 days.

(21) Appl. No.: 16/822,556

(22) Filed: Mar. 18, 2020

(65) Prior Publication Data

US 2020/0304935 A1  Sep. 24, 2020

Related U.S. Application Data

(60) Provisional application No. 62/821,190, filed on Mar. 20, 2019.

(51) Int. Cl.
*H04S 7/00* (2006.01)
*H04R 5/033* (2006.01)
(Continued)

(52) U.S. Cl.
CPC ............. *H04S 7/304* (2013.01); *H04R 5/033* (2013.01); *H04R 5/04* (2013.01); *H04S 3/008* (2013.01); *H04S 2400/01* (2013.01)

(58) Field of Classification Search
CPC ...... H04S 7/304; H04S 3/008; H04S 2400/01; H04R 5/033; H04R 5/04
See application file for complete search history.

(56) References Cited

U.S. PATENT DOCUMENTS 10,405,126 B2   9/2019   Peters et al.
2011/0249821 A1  10/2011  Jaillet et al.
(Continued)

FOREIGN PATENT DOCUMENTS

WO    2016209607 A1   12/2016
WO    2018234625 A1   12/2018

OTHER PUBLICATIONS

International Search Report and Written Opinion—PCT/US2020/023565—ISAEPO—Jun. 25, 2020 16 Pages.
(Continued)

*Primary Examiner* — Andrew L Sniezek
(74) *Attorney, Agent, or Firm* — Espartaco Diaz Hidalgo

(57) ABSTRACT

In general, techniques are described for rendering metadata to control user movement based audio rendering. A device comprising a memory and one or more processors may be configured to perform the techniques. The memory may be configured to store audio data representative of a soundfield. The one or more processors may be coupled to the memory, and configured to obtain rendering metadata indicative of controls for enabling or disabling adaptations, based on an indication of a movement of a user of the device, of a renderer used to render audio data representative of a soundfield, specify, in a bitstream representative of the audio data, the rendering metadata, and output the bitstream.

21 Claims, 14 Drawing Sheets

(51) Int. Cl.
H04S 3/00 (2006.01)
H04R 5/04 (2006.01)

(56) References Cited

U.S. PATENT DOCUMENTS

2018/0046431 A1 2/2018 Shivappa et al.
2019/0007781 A1 1/2019 Peters et al.
2021/0037335 A1* 2/2021 Fersch .................... H04S 7/304

OTHER PUBLICATIONS

Anonymous: "ISO/IEC JTC 1/SC 29 N ISO/IEC 23008-3:2015/PDAM 3 Information Technology—High Efficiency Coding and Media Delivery in Heterogeneous Environments—Part 3: Part 3: 3D Audio, AMENDMENT 3: MPEG-H 3D Audio Phase 2", Jul. 25, 2015 (Jul. 25, 2015), XP055329830, p. 84. Retrieved from the Internet: URL: http://mpeg.chiariglione.orgjstandards/mpeg-hj3d-audiojtext-isoiec-23008-3201xpdam-3-mpeg-h-3d-audio-phase-2.
Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.
ETSI TS 103 589 V1.1.1, "Higher Order Ambisonics (HOA) Transport Format", Jun. 2018, 33 pages.
Herre, et al., "MPEG-H 3D Audio—The New Standard for Coding of Immersive Spatial Audio," IEEE Journal of Selected Topics in Signal Processing, vol. 9, No. 5, Aug. 2015, pp. 770-779.
Hollerweger F., "An Introduction to Higher Order Ambisonic," Oct. 2008, p. 13, Accessed online [Jul. 8, 2013].
"Information technology—High Efficiency Coding and Media Delivery in Heterogeneous Environments—Part 3: 3D Audio," ISO/IEC JTC 1/SC 29/WG11, ISO/IEC 23008-3, 201x(E), Oct. 12, 2016, 797 Pages.
ISO/IEC DIS 23008-3 Information Technology—High Efficiency coding and media delivery in heterogeneous environments—Part 3: 3D audio, Jul. 25, 2014 (Jul. 25, 2014), XP055205625, Retrieved from the Internet URL: http://mpeg.chiariglione.org/standards/mpeg-h/3d-audio/dis-mpeg-h-3d-audio [retrieved on Jul. 30, 2015], 433 pages.
ISO/IEC/JTC: "ISO/IEC JTC 1/SC 29 N ISO/IEC CD 23008-3 Information technology—High efficiency coding and media delivery in heterogeneous environments—Part 3: 3D audio," Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015]. "Spatial Audio API", pp. 1-27.
Peterson J., et al., "Virtual Reality, Augmented Reality, and Mixed Reality Definitions," EMA, version 1.0, Jul. 7, 2017, 4 pages.
Poletti M.A., "Three-Dimensional Surround Sound Systems Based on Spherical Harmonics", The Journal of the Audio Engineering Society, vol. 53, No. 11, Nov. 2005, pp. 1004-1025.
Schonefeld V., "Spherical Harmonics," Jul. 1, 2005, XP002599101, 25 Pages, Accessed online [Jul. 9, 2013] at URL:http://heim.c-otto.de/~volker/prosem_paper.pdf.
Sen D., et al., "RM1-HOA Working Draft Text", 107. MPEG Meeting; Jan. 13, 2014—Jan. 17, 2014; San Jose; (Motion Picture Expert Group or ISO/IEC JTC1/SC29/WG11), No. m31827, Jan. 11, 2014 (Jan. 11, 2014), 83 Pages, XP030060280.
Sen D., et al., "Technical Description of the Qualcomm's HoA Coding Technology for Phase II", 109. MPEG Meeting; Jul. 7, 2014-Nov. 7, 2014; Sapporo; (Motion Picture Expert Group or ISO/IEC JTC1/SC29/NG11), No. m34104, Jul. 2, 2014 (Jul. 2, 2014), 4 Pages, XP030062477, figure 1.
Wikipedia: "Doppler effect", Retrieved from the Internet: https://en.wikipedia.org/wiki/Doppler_effect, retrieved on Mar. 2, 2020, 13 pages.

* cited by examiner

RENDERING METADATA TO CONTROL USER MOVEMENT BASED AUDIO RENDERING

This application claims the benefit of U.S. Provisional Patent Application No. 62/821,190, entitled "RENDERING METADATA TO CONTROL USER MOVEMENT BASED AUDIO RENDERING," filed Mar. 20, 2019, the entire contents of which are hereby incorporated by reference.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems may include, as examples, virtual reality (VR) systems, augmented reality (AR) systems, and mixed reality (MR) systems. The perceived success of computer-mediated reality systems are generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly import factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. The techniques may provide rendering metadata that allows for control of user movement-based rendering of audio data for VR, MR, AR, etc.

In one example, the techniques are directed to a device comprising: a memory configured to store audio data representative of a soundfield; and one or more processors coupled to the memory, and configured to: obtain, from a bitstream representative of the audio data, rendering metadata indicative of controls for enabling or disabling adaptations, based on an indication of a movement of a user of the device, of a renderer; obtain the indication of the movement of the user; obtain, based on the rendering metadata and the indication, a renderer by which to render the audio data into one or more speaker feeds; and apply the renderer to the audio data to generate the speaker feeds.

In another example, the techniques are directed to a method comprising: obtaining, from a bitstream representative of audio data defining a soundfield, rendering metadata indicative of controls for enabling or disabling adaptations, based on an indication of a movement of a user of a device, of a renderer; obtaining the indication of the movement by the user; obtaining, based on the rendering metadata and the indication, a renderer by which to render the audio data into one or more speaker feeds; and applying the renderer to the audio data to generate the speaker feeds.

In another example, the techniques are directed to a device comprising: means for obtaining, from a bitstream representative of audio data defining a soundfield, rendering metadata indicative of controls for enabling or disabling adaptations, based on an indication of a movement of a user of the device, of a renderer; means for obtaining the indication of the movement by the user; means for obtaining, based on the rendering metadata and the indication, a renderer by which to render the audio data into one or more speaker feeds; and means for applying the renderer to the audio data to generate the speaker feeds.

In another example, the techniques are directed to a non-transitory computer-readable storage medium having stored thereon instructions that, when executed, cause one or more processors of a device to: obtain, from a bitstream representative of audio data defining a soundfield, rendering metadata indicative of controls for enabling or disabling adaptations, based on an indication of a movement of a user of the device, of a renderer; obtain the indication of the movement by the user; obtain, based on the rendering metadata and the indication, a renderer by which to render the audio data into one or more speaker feeds; and apply the renderer to the audio data to generate the speaker feeds.

In another example, the techniques are directed to a device comprising: a memory configured to store audio data representative of a soundfield; and one or more processors coupled to the memory, and configured to: obtain rendering metadata indicative of controls for enabling or disabling adaptations, based on an indication of a movement of a user of the device, of a renderer used to render audio data representative of a soundfield; specify, in a bitstream representative of the audio data, the rendering metadata; and output the bitstream.

In another example, the techniques are directed to a method comprising: obtaining rendering metadata indicative of controls for enabling or disabling adaptations, based on an indication of a movement of a user of a device, of a renderer used to render audio data representative of a soundfield; specifying, in a bitstream representative of the audio data, the rendering metadata; and outputting the bitstream.

In another example, the techniques are directed to a device comprising: means for obtaining rendering metadata indicative of controls for enabling or disabling adaptations, based on an indication of a movement of a user of the device, of a renderer used to render audio data representative of a soundfield; means for specifying, in a bitstream representative of the audio data, the rendering metadata; and means for outputting the bitstream.

In another example, the techniques are directed to a non-transitory computer-readable storage medium having stored thereon instructions that, when executed, cause one or more processors of a device to: obtain rendering metadata indicative of controls for enabling or disabling adaptations, based on an indication of a movement of a user of the device, of a renderer used to render audio data representative of a soundfield; specify, in a bitstream representative of the audio data, the rendering metadata; and output the bitstream.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
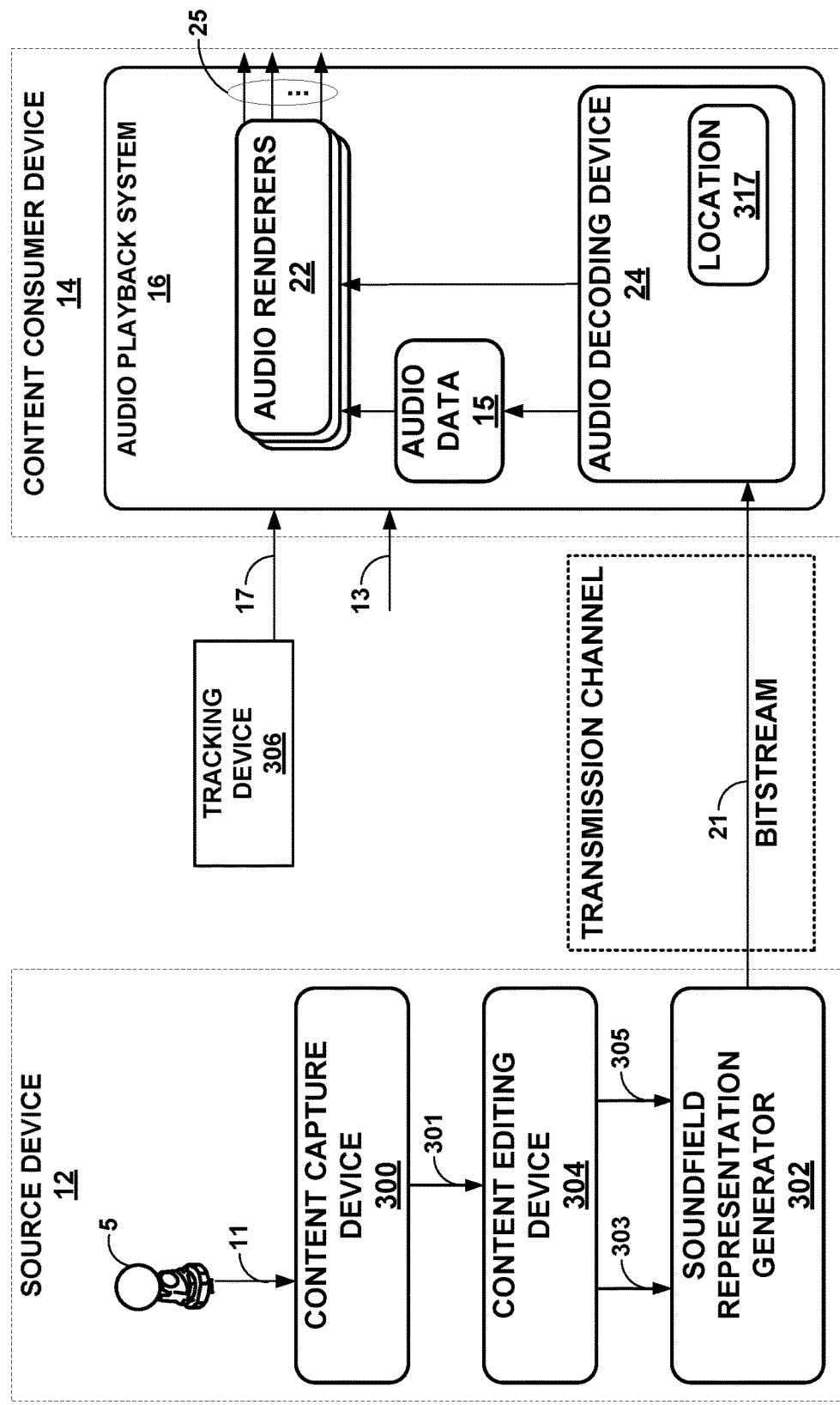
FIGS. 1A and 1B are diagrams illustrating systems that may perform various aspects of the techniques described in this disclosure.

There are various 'surround-sound' channel-based formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once, and not spend effort to remix it for each speaker configuration. The Moving Pictures Expert Group (MPEG) has released a standard allowing for soundfields to be represented using a hierarchical set of elements (e.g., Higher-Order Ambisonic—HOA—coefficients) that can be rendered to speaker feeds for most speaker configurations, including 5.1 and 22.2 configuration whether in location defined by various standards or in non-uniform locations.

MPEG released the standard as MPEG-H 3D Audio standard, formally entitled "Information technology—High efficiency coding and media delivery in heterogeneous environments—Part 3: 3D audio," set forth by ISO/IEC JTC 1/SC 29, with document identifier ISO/IEC DIS 23008-3, and dated Jul. 25, 2014. MPEG also released a second edition of the 3D Audio standard, entitled "Information technology—High efficiency coding and media delivery in heterogeneous environments—Part 3: 3D audio, set forth by ISO/IEC JTC 1/SC 29, with document identifier ISO/IEC 23008-3:201x(E), and dated Oct. 12, 2016. Reference to the "3D Audio standard" in this disclosure may refer to one or both of the above standards.

As noted above, one example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as higher order ambisonic—HOA—coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_s),$$

where i is $\sqrt{-1}$, $h_n^{(2)}(\bullet)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$.

Scene-based audio formats, such as the above noted SHC, represent one way by which to represent a soundfield. Other possible formats include channel-based audio formats and object-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include metadata identifying a location of the audio object relative to a listener or other point of reference in the soundfield, such that the audio object may be rendered to one or more speaker channels for playback in an effort to recreate the soundfield. The techniques described in this disclosure may apply to any of the foregoing formats, including scene-based audio formats, channel-based audio formats, object-based audio formats, or any combination thereof.

Figure 1B:
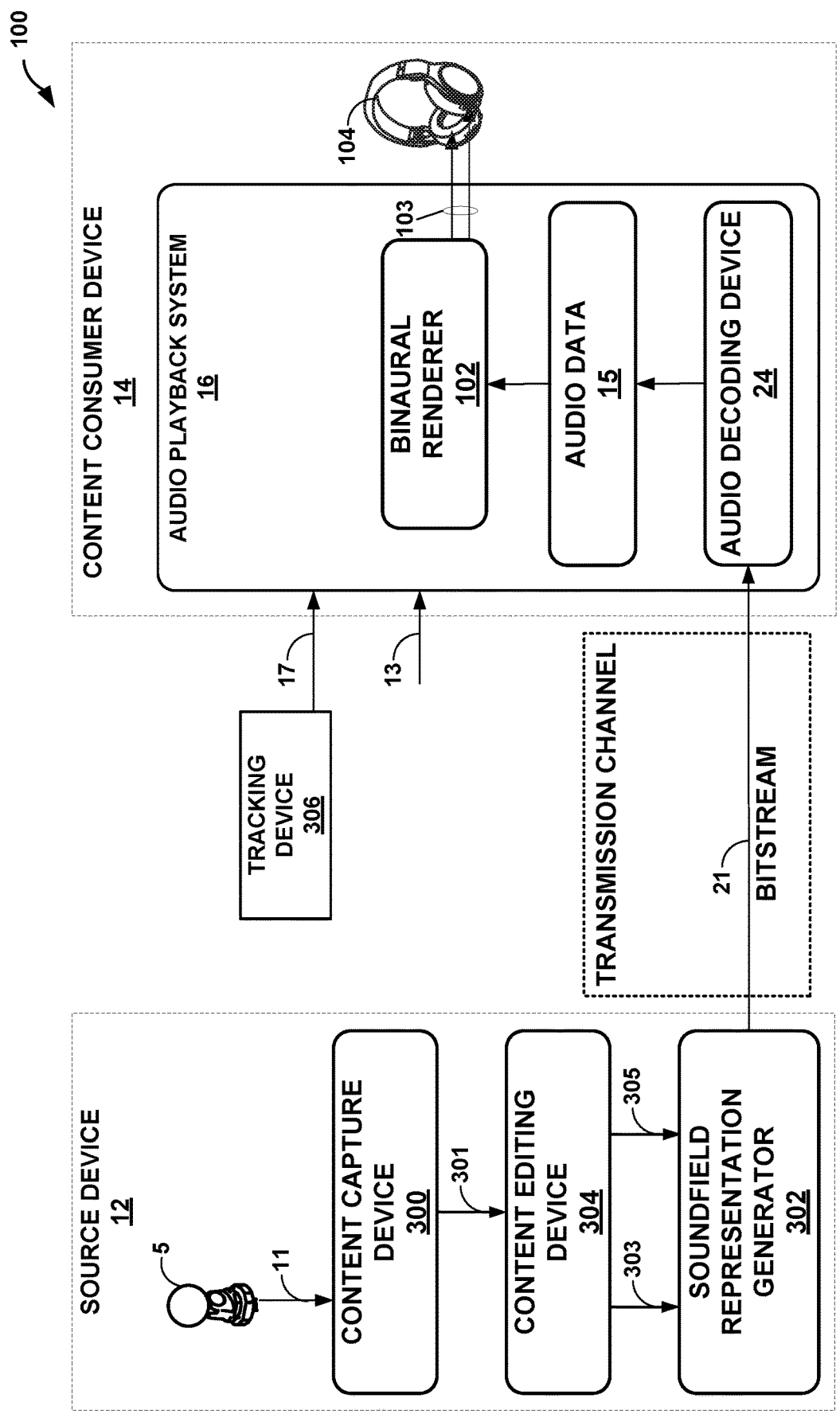

FIGS. 1A and 1B are diagrams illustrating systems that may perform various aspects of the techniques described in this disclosure. As shown in the example of FIG. 1A, system 10 includes a source device 12 and a content consumer device 14. While described in the context of the source device 12 and the content consumer device 14, the techniques may be implemented in any context in which any representation of a soundfield is encoded to form a bitstream representative of the audio data. Moreover, the source device 12 may represent any form of computing device capable of generating the representation of a soundfield, and is generally described herein in the context of being a VR content creator device. Likewise, the content consumer device 14 may represent any form of computing device capable of implementing rendering metadata techniques described in this disclosure as well as audio playback, and is generally described herein in the context of being a VR client device.

The source device 12 may be operated by an entertainment company or other entity that may generate multichannel audio content for consumption by operators of content consumer devices, such as the content consumer device 14. In some VR scenarios, the source device 12 generates audio content in conjunction with video content. The source device 12 includes a content capture device 300, a content editing device 304, and a soundfield representation generator 302. The content capture device 300 may be configured to interface or otherwise communicate with a microphone 5.

The microphone 5 may represent an Eigenmike® or other type of 3D audio microphone capable of capturing and representing the soundfield as audio data 11, which may refer to one or more of the above noted scene-based audio data (such as HOA coefficients), object-based audio data, and channel-based audio data. Although described as being 3D audio microphones, the microphone 5 may also represent other types of microphones (such as omni-directional microphones, spot microphones, unidirectional microphones, etc.) configured to capture the audio data 11.

The content capture device 300 may, in some examples, include an integrated microphone 5 that is integrated into the housing of the content capture device 300. The content capture device 300 may interface wirelessly or via a wired connection with the microphone 5. Rather than capture, or in conjunction with capturing, the audio data 11 via microphone 5, the content capture device 300 may process the audio data 11 after the audio data 11 is input via some type of removable storage, wirelessly and/or via wired input processes. As such, various combinations of the content capture device 300 and the microphone 5 are possible in accordance with this disclosure.

The content capture device 300 may also be configured to interface or otherwise communicate with the content editing device 304. In some instances, the content capture device 300 may include the content editing device 304 (which in some instances may represent software or a combination of software and hardware, including the software executed by the content capture device 300 to configure the content capture device 300 to perform a specific form of content editing in accordance with various aspects of the techniques described in this disclosure). The content editing device 304 may represent a unit configured to edit or otherwise alter content 301 received from content capture device 300, including the audio data 11. The content editing device 304 may output edited content 303 and associated metadata 305 to the soundfield representation generator 302.

The soundfield representation generator 302 may include any type of hardware device capable of interfacing with the content editing device 304 (or the content capture device 300). Although not shown in the example of FIG. 1A, the soundfield representation generator 302 may use the edited content 303, including the audio data 11 and metadata 305, provided by the content editing device 304 to generate one or more bitstreams 21. In the example of FIG. 1A, which focuses on the audio data 11, the soundfield representation generator 302 may generate one or more representations of the same soundfield represented by the audio data 11 to obtain a bitstream 21 that includes the representations of the soundfield and audio metadata 305.

For instance, to generate the different representations of the soundfield using HOA coefficients (which again is one example of the audio data 11), soundfield representation generator 302 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FO COMPUTER-MEDIATED REALITY SYSTEMS," and filed Aug. 8, 2017, published as U.S. patent publication no. 20190007781 on Jan. 3, 2019.

To generate a particular MOA representation of the soundfield, the soundfield representation generator 302 may generate a partial subset of the full set of HOA coefficients. For instance, each MOA representation generated by the soundfield representation generator 302 may provide precision with respect to some areas of the soundfield, but less precision in other areas. In one example, an MOA representation of the soundfield may include eight (8) uncompressed HOA coefficients of the HOA coefficients, while the third order HOA representation of the same soundfield may include sixteen (16) uncompressed HOA coefficients of the HOA coefficients. As such, each MOA representation of the soundfield that is generated as a partial subset of the HOA coefficients may be less storage-intensive and less bandwidth intensive (if and when transmitted as part of the bitstream 21 over the illustrated transmission channel) than the corresponding third order HOA representation of the same soundfield generated from the HOA coefficients.

Although described with respect to MOA representations, the techniques of this disclosure may also be performed with respect to full-order ambisonic (FOA) representations in which all of the HOA coefficients for a given order N are used to represent the soundfield. In other words, rather than represent the soundfield using a partial, non-zero subset of the HOA coefficients, the soundfield representation generator 302 may represent the soundfield using all of the HOA coefficients for a given order N, resulting in a total of HOA coefficients equaling $(N+1)^2$.

In this respect, the higher order ambisonic audio data (which is another way to refer to HOA coefficients in either MOA representations or FOA representations) may include higher order ambisonic coefficients associated with spherical basis functions having an order of one or less (which may be referred to as "$1^{st}$ order ambisonic audio data"), higher order ambisonic coefficients associated with spherical basis functions having a mixed order and suborder (which may be referred to as the "MOA representation" discussed above), or higher order ambisonic coefficients associated with spherical basis functions having an order greater than one (which is referred to above as the "FOA representation").

The content capture device 300 or the content editing device 304 may, in some examples, be configured to wirelessly communicate with the soundfield representation generator 302. In some examples, the content capture device 300 or the content editing device 304 may communicate, via one or both of a wireless connection or a wired connection, with the soundfield representation generator 302. Via the connection between the content capture device 300 and the soundfield representation generator 302, the content capture device 300 may provide content in various forms of content, which, for purposes of discussion, are described herein as being portions of the audio data 11.

In some examples, the content capture device 300 may leverage various aspects of the soundfield representation generator 302 (in terms of hardware or software capabilities of the soundfield representation generator 302). For example, the soundfield representation generator 302 may include dedicated hardware configured to (or specialized software that when executed causes one or more processors to) perform psychoacoustic audio encoding (such as a unified speech and audio coder denoted as "USAC" set forth by the Motion Picture Experts Group (MPEG) or the MPEG-H 3D audio coding standard). The content capture device 300 may not include the psychoacoustic audio encoder dedicated hardware or specialized software and instead may provide audio aspects of the content 301 in a non-psychoacoustic-audio-coded form. The soundfield representation generator 302 may assist in the capture of content 301 by, at least in part, performing psychoacoustic audio encoding with respect to the audio aspects of the content 301.

The soundfield representation generator 302 may also assist in content capture and transmission by generating one or more bitstreams 21 based, at least in part, on the audio content (e.g., MOA representations and/or third order HOA representations) generated from the audio data 11 (in the case where the audio data 11 includes scene-based audio data). The bitstream 21 may represent a compressed version of the audio data 11 and any other different types of the content 301 (such as a compressed version of spherical video data, image data, or text data).

The soundfield representation generator 302 may generate the bitstream 21 for transmission, as one example, across a transmission channel, which may be a wired or wireless channel, a data storage device, or the like. The bitstream 21 may represent an encoded version of the audio data 11, and may include a primary bitstream and another side bitstream, which may be referred to as side channel information. In some instances, the bitstream 21 representing the compressed version of the audio data 11 (which again may represent scene-based audio data, object-based audio data, channel-based audio data, or combinations thereof) may conform to bitstreams produced in accordance with the MPEG-H 3D audio coding standard.

The content consumer device 14 may be operated by an individual, and may represent a VR client device. Although described with respect to a VR client device, content consumer device 14 may represent other types of devices, such as an augmented reality (AR) client device, a mixed reality (MR) client device, a standard computer, a headset, headphones, or any other device capable of tracking head movements and/or general translational movements of the individual operating the client consumer device 14. As shown in the example of FIG. 1A, the content consumer device 14 includes an audio playback system 16, which may refer to any form of audio playback system capable of rendering the audio data 11 for playback as multi-channel audio content.

While shown in FIG. 1A as being directly transmitted to the content consumer device 14, the source device 12 may output the bitstream 21 to an intermediate device positioned between the source device 12 and the content consumer device 14. The intermediate device may store the bitstream 21 for later delivery to the content consumer device 14, which may request the bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer device 14, requesting the bitstream 21.

Alternatively, the source device 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 21) stored to the mediums are transmitted (and may include retail stores and other store-based delivery mechanism). In any event, the techniques of this disclosure should not therefore be limited in this respect to the example of FIG. 1A.

As noted above, the content consumer device 14 includes the audio playback system 16. The audio playback system 16 may represent any system capable of playing back multi-channel audio data. The audio playback system 16 may include a number of different renderers 22. The renderers 22 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16 may further include an audio decoding device 24. The audio decoding device 24 may represent a device configured to decode bitstream 21 to output audio data 15. Again, the audio data 15 may include scene-based audio data that in some examples, may form the full third order HOA representation or a subset thereof that forms an MOA representation of the same soundfield, decompositions thereof, such as the predominant audio signal, ambient HOA coefficients, and the vector based signal described in the MPEG-H 3D Audio Coding Standard, or other forms of scene-based audio data. As such, the audio data 15 may be similar to a full set or a partial subset of the audio data 11, but may differ due to lossy operations (e.g., quantization) and/or transmission via the transmission channel.

The audio data 15 may include, as an alternative to, or in conjunction with the scene-based audio data, channel-based audio data. The audio data 15 may include, as an alternative to, or in conjunction with the scene-based audio data, object-based audio data. As such, the audio data 15 may include any combination of scene-based audio data, object-based audio data, and channel-based audio data.

The audio renderers 22 of audio playback system 16 may, after audio decoding device 24 has decoded the bitstream 21 to obtain the audio data 15, render the audio data 15 to output speaker feeds 25. The speaker feeds 25 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16 may obtain speaker information 13 indicative of a number of speakers (e.g., loudspeakers or headphone speakers) and/or a spatial geometry of the speakers. In some instances, the audio playback system 16 may obtain the speaker information 13 using a reference microphone and driving the speakers in such a manner as to dynamically determine the speaker information 13. In other instances, or in conjunction with the dynamic determination of the speaker information 13, the audio playback system 16 may prompt a user to interface with the audio playback system 16 and input the speaker information 13.

The audio playback system 16 may select one of the audio renderers 22 based on the speaker information 13. In some instances, the audio playback system 16 may, when none of the audio renderers 22 are within some threshold similarity measure (in terms of the speaker geometry) to the speaker geometry specified in the speaker information 13, generate the one of audio renderers 22 based on the speaker information 13. The audio playback system 16 may, in some instances, generate one of the audio renderers 22 based on the speaker information 13 without first attempting to select an existing one of the audio renderers 22.

When outputting the speaker feeds 25 to headphones, the audio playback system 16 may utilize one of the renderers 22 that provides for binaural rendering using head-related transfer functions (HRTF) or other functions capable of rendering to left and right speaker feeds 25 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 25.

Although described as rendering the speaker feeds 25 from the audio data 15, reference to rendering of the speaker feeds 25 may refer to other types of rendering, such as rendering incorporated directly into the decoding of the audio data 15 from the bitstream 21. An example of the alternative rendering can be found in Annex G of the MPEG-H 3D audio coding standard, where rendering occurs during the predominant signal formulation and the background signal formation prior to composition of the soundfield. As such, reference to rendering of the audio data 15 should be understood to refer to both rendering of the actual audio data 15 or decompositions or representations thereof of the audio data 15 (such as the above noted predominant audio signal, the ambient HOA coefficients, and/or the vector-based signal—which may also be referred to as a V-vector).

Figure 2:
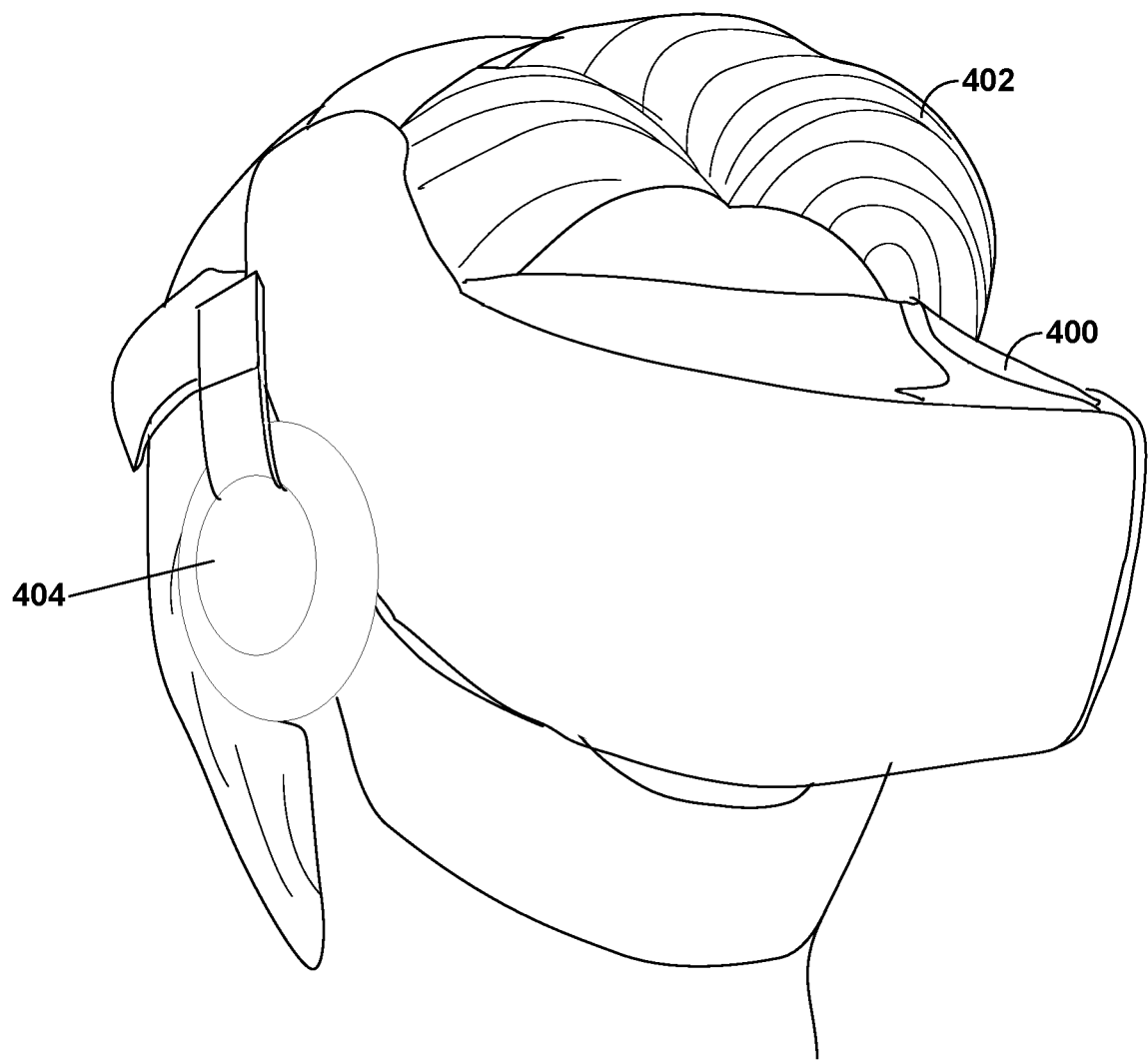
FIG. 2 is a diagram illustrating an example of a VR device worn by a user.

As described above, the content consumer device 14 may represent a VR device in which a human wearable display is mounted in front of the eyes of the user operating the VR device. FIG. 2 is a diagram illustrating an example of a VR device 400 worn by a user 402. The VR device 400 is coupled to, or otherwise includes, headphones 404, which may reproduce a soundfield represented by the audio data 15 through playback of the speaker feeds 25. The speaker feeds 25 may represent an analog or digital signal capable of causing a membrane within the transducers of headphones 404 to vibrate at various frequencies, where such process is commonly referred to as driving the headphones 404.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may include a tracking device (e.g., the tracking device 306) that is configured to track head movement of the user 402, and adapt the video data shown via the VR headset 400 to account for the head movements, providing an immersive experience in which the user 402 may experience a virtual world shown in the video data in visual three dimensions.

While VR (and other forms of AR and/or MR) may allow the user 402 to reside in the virtual world visually, often the VR headset 400 may lack the capability to place the user in the virtual world audibly. In other words, the VR system (which may include a computer responsible for rendering the video data and audio data—that is not shown in the example of FIG. 2 for ease of illustration purposes, and the VR headset 400) may be unable to support full three-dimension immersion audibly (and in some instances realistically in a manner that reflects the virtual scene displayed to the user via the VR headset 400).

The audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for VR. As such, the audio aspects of VR are less immersive than the video aspects, thereby potentially reducing the overall immersion experienced by the user.

Furthermore, there exist few controls that enable content creators to maintain a desired aesthetic, thereby potentially limiting an ability of content creators to provide a consistent immersive experience. That is, the user 402 may unintentionally or even intentionally enable certain types of rendering that the content creator envisions as limiting the desired aesthetic or disable certain types of rendering that the content creator envisions as enabling the desired aesthetic. The lack of controls may hamper adoption of VR for content creators, thereby potentially reducing the amount content available for VR, which in turn may reduce adoption of VR by users. Further, the lack of content creator controls may limit the VR experience (e.g., in terms of immersion and/or artistic aesthetic).

In accordance with the techniques described in this disclosure, the source device 12 may obtain rendering metadata indicative of controls for enabling or disabling adaptations, based on an indication of a movement of a user of a device, of a renderer (e.g., one or more of audio renderers 22) used to render the audio data 15 representative of a soundfield. In some examples, the soundfield representation generator 302 may obtain the rendering metadata indicative of the controls for enabling or disabling adaptations, based on the indication of movement of the user 402 of the VR headset 400, to the audio renderer 22 used to render the audio data 15.

The soundfield representation generator 302 may, in some instances, receive the rendering metadata from the content editing device 304 as part of the metadata 305. As such, the rendering metadata may be referred to as "rendering metadata 305." In this instance, an audio editor or other operator of the source device 12 may specify the rendering metadata 305 via the content editing device 304. In some instances, the soundfield representation generator 302 may programmatically generate the rendering metadata 305 possibly based on the content 303 or other types of metadata 305. In any event, the soundfield representation generator 302 may specify, in the bitstream 21 representative of the audio data 11, the rendering metadata 305, and output the bitstream 21.

The audio decoding device 24 of the audio playback system 16 may obtain, from the bitstream 21, the rendering metadata 305. The audio playback system 16 may obtain an indication 17 of the movement of the user 402 via a tracking device 306. The tracking device 306 may be integrated within or external to VR headset 400. The tracking device 306 may represent any type of device capable of detecting or otherwise obtaining the indication 17 of the movement of the user 402. The tracking device 306, as one example, may include a gyroscope and an accelerometer that are integrated into the VR headset 400.

In addition or as an alternative to the gyroscope and the accelerometer, the tracking device 306 may include one or more cameras (including a camera capable of sensing infrared light) that captures an image of the VR headset 400 and/or the user 402 in an effort to identify movement within a space viewable by the camera. The tracking device 306 may also, again as an alternative to or in conjunction with any of the foregoing examples, include one or more of a radar system (using radio or other electromagnetic waves to obtain the indication 17), a sonar system (using sound waves to obtain the indication 17), and any other type of system designed to obtain indications similar to the indication 17.

In any event, the audio playback system 16 may obtain the indication 17, and obtain, based on the rendering metadata 305 and the indication 17, one of the renderers 22 by which to render the audio data 15 into the speaker feeds 25. The rendering metadata 305 may, as noted above, include one or more indications of controls for enabling or disabling adaptations of the one of the renderers 22 based on the indication 17 of the movement of the user 402 of the VR headset 402.

For example, the rendering metadata 305 may include translational rendering metadata indicative of controls for enabling or disabling translation adaptations, based on translational movement of the user 402 (which may refer to movements of the user 402 through space, e.g., walking forward or backwards, moving laterally side to side, etc.). As another example, the rendering metadata 305 may include rotational rendering metadata indicative of controls for enabling or disabling rotational adaptations, based on rotational movement of the user 402 (e.g., turning of the head or body, spinning in place, etc.).

The following syntax table provides an example of how the translational and rotational rendering metadata may be defined within the bitstream 21.

| Syntax | No. of bits | Mnemonic |
|---|---|---|
| { | | |
| for (k=0; k<numAudioElement; k++) { | | |
| allowTranslation[k]; | 1 | bslbf |
| allowRotation[k]; | 1 | bslbf |
| } | | |
| } | | |

The foregoing syntax elements allowTranslation and allowRotation are semantically defined as follows:

AllowTranslation: This flag may define if the associated audio element k shall be updated in the context of processing of tracking data for translational movements (scene displacement data). In case the flag is equal to one, the positions of the corresponding audio elements are not updated due to translational user movements. In case the flag is equal to one, the positions of the corresponding audio elements are updated based on translational user movements in case such sensor input data exist.

AllowRotation: This flag may define if the associated audio element k shall be updated in the context of processing of tracking data for head rotation movements (scene displacement data). In case the flag is equal to one, the positions of the corresponding audio elements are not updated due to head-rotation user movements. In case the flag is equal to one, the positions of the corresponding audio elements are updated based on head-rotation user movements in case such sensor input data exist.

Figure 3A:
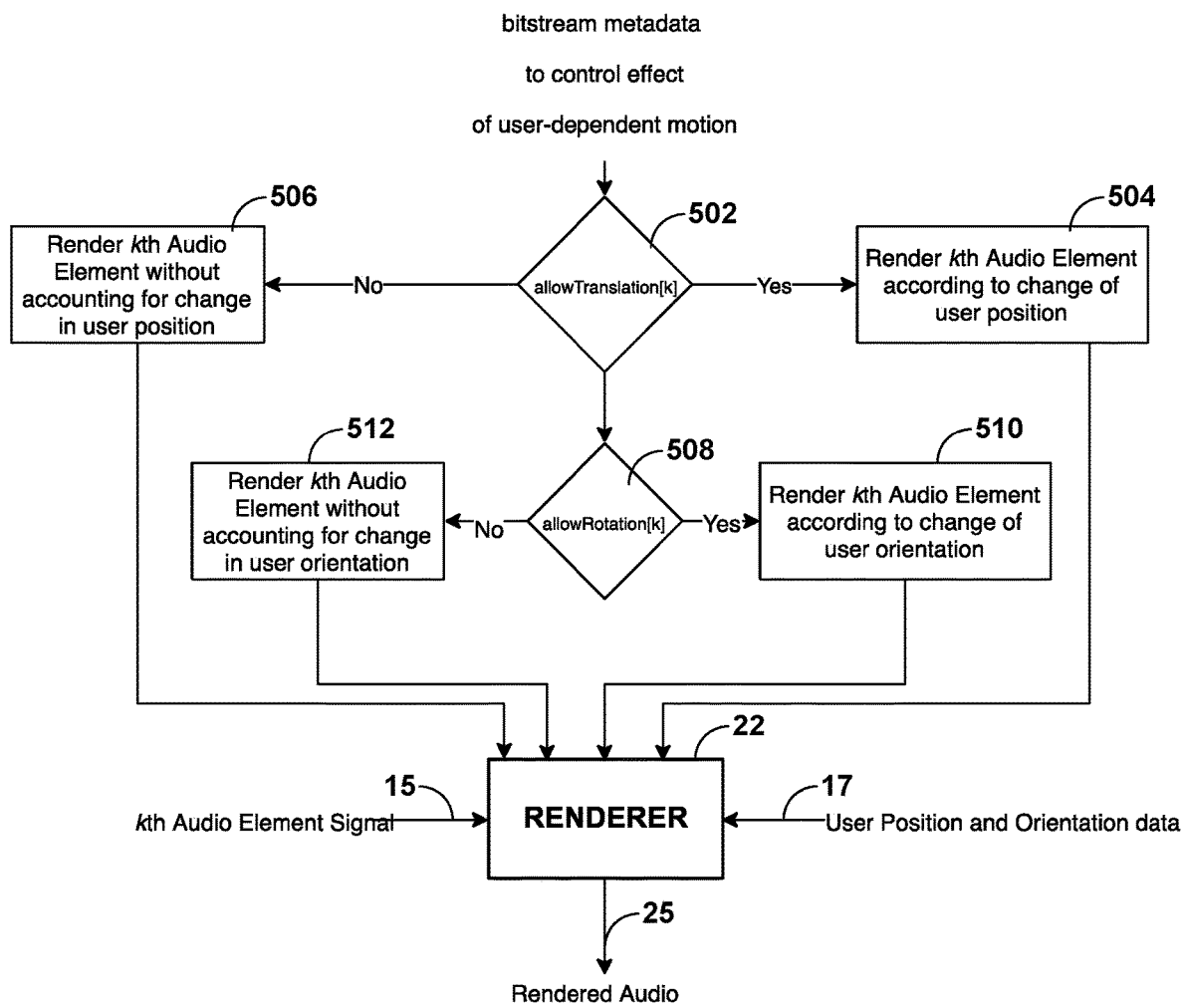
FIGS. 3A-3G are flowcharts illustrating example operation of the audio playback system of FIGS. 1A and 1B in performing various aspects of the controlled user based movement audio rendering techniques described int his disclosure.

The audio playback system 16 may process the foregoing syntax elements and adapt the one of renderers 22 using the syntax elements according to the flowchart set forth in the example of FIG. 3A. FIG. 3A is a flowchart illustrating example operation of the audio playback system of FIG. 1A in performing various aspects of the controlled user based movement audio rendering techniques described int his disclosure.

In the example of FIG. 3A, the audio playback system 16 may first determine whether the allowTranslation syntax element (which is an example of bitstream metadata that may control the effect of user-dependent motion) is either true ("Yes") or false ("No") (502). When the allowTranslation syntax element is true ("Yes" 502), the audio playback system 16 may adapt the renderer 22 for the kth audio element according to a change of user position, thereby rendering the kth audio element according to a change in user position as indicated by the indication 17 (504). When the allowTranslation syntax element is false ("No" 502), the audio playback system 16 may adapt the renderer 22 for the kth audio element to disregard changes in user position, thereby rendering the kth audio element without accounting for the change in user position as indicated by the indication 17 (506).

Likewise, the audio playback system 16 may determine whether the allowRotation syntax element is true ("Yes") or false ("No") (508). When the allowRotation syntax element is true ("Yes" 508), the audio playback system 16 may adapt the renderer 22 for the kth audio element according to a change of user orientation, thereby rendering the kth audio element according to a change in user orientation as indicated by the indication 17 (510). When the allowRotation syntax element is false ("No" 508), the audio playback system 16 may adapt the renderer 22 for the kth audio element to disregard changes in user orientation, thereby rendering the kth audio element without accounting for the change in user orientation as indicated by the indication 17 (512).

To illustrate another example, the rendering metadata 305 may include one or more of the following types of rendering metadata:

Six degrees of freedom rendering metadata indicative of controls for enabling or disabling six degrees of freedom adaptations, based on translational movement and rotational movement of the user, of the renderer;

Three degrees of freedom plus rendering metadata indicative of controls for enabling or disabling three degrees of freedom adaptations, based on translation movement of a head of the user and rotational movement of the user, of the renderer; and Three degrees of freedom rendering metadata indicative of controls for enabling or disabling three degrees of freedom adaptations, based on rotational movement of the user, of the renderer.

The following syntax table provides an example of how the 6DOF, 3DOF+, and 3DOF rendering metadata may be defined within the bitstream 21.

| Syntax | No. of bits | Mnemonic |
|---|---|---|
| { | | |
| for (k=0; k<numAudioElement; k++) { | | |
| allow6DOF[k]; | 1 | bslbf |
| if allow6DOF[k]==0 { | | |
| allow3DOFplus[k]; | 1 | bslbf |
| if allow3DOFplus[k]==0 { | | |
| allow3DOF[k]; } | 1 | bslbf |
| } | | |
| } | | |
| } | | |

The foregoing syntax elements allow6DOF, allow3DOFplus, and allow3DOF are semantically defined as follows:

Allow6DOF: This flag may define whether the associated audio element k shall be updated in the context of processing of tracking data with six degrees of freedom movement (x,y,z, yaw, pitch, roll).

Allow3DOFplus: This flag may define whether the associated audio element k shall be updated in the context of processing of tracking data with 3 degrees of freedom movement plus slight translations (yaw, pitch, roll, plus slight translation in x y z).

Allow3DOF: This flag may define whether the associated audio element k shall be updated in the context of processing of tracking data with 3 degrees of freedom movement (yaw, pitch, roll, no translation).

To illustrate yet another example, the rendering metadata 305 may include one or more of the following types of rendering metadata:

x-axis rendering metadata indicative of controls for enabling or disabling x-axis adaptations, based on x-axis movement of the user of the device, of the renderer;

y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer;

yaw rendering metadata indicative of controls for enabling or disabling yaw adaptations, based on yaw movement of the user of the device, of the renderer;

pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

The following syntax table provides an example of how the preceding rendering metadata may be defined within the bitstream 21.

| Syntax | No. of bits | Mnemonic |
|---|---|---|
| { | | |
| for (k=0; k<numAudioElement; k++) { | | |
| allowX[k]; | 1 | bslbf |
| allowY[k]; | 1 | bslbf |
| allowZ[k]; | 1 | bslbf |
| allowYaw[k]; | 1 | bslbf |
| allowPitch[k]; | 1 | bslbf |
| allowRoll[k]; | 1 | bslbf |
| } | | |
| } | | |

The foregoing syntax elements allowX, allowY, allowZ, allowYaw, allowPitch, and allowRoll are semantically defined as follows:

allowX: This flag may define whether the associated audio element k shall be updated in the context of processing of tracking data for translational movements along the x-axis of the coordinate system.

allowY: This flag may define whether the associated audio element k shall be updated in the context of processing of tracking data for translational movements along the y-axis of the coordinate system.

allowZ: This flag may define whether the associated audio element k shall be updated in the context of processing of tracking data for translational movements along the z-axis of the coordinate system.

AllowYaw: This flag may define whether the associated audio element k shall be updated in the context of processing of tracking data for the rotational yaw movement of the head.

AllowPitch: This flag may define whether the associated audio element k shall be updated in the context of processing of tracking data for the rotational pitch movement of the head.

AllowRoll: This flag may define whether the associated audio element k shall be updated in the context of processing of tracking data for the rotational roll movement of the head.

Figure 3B:
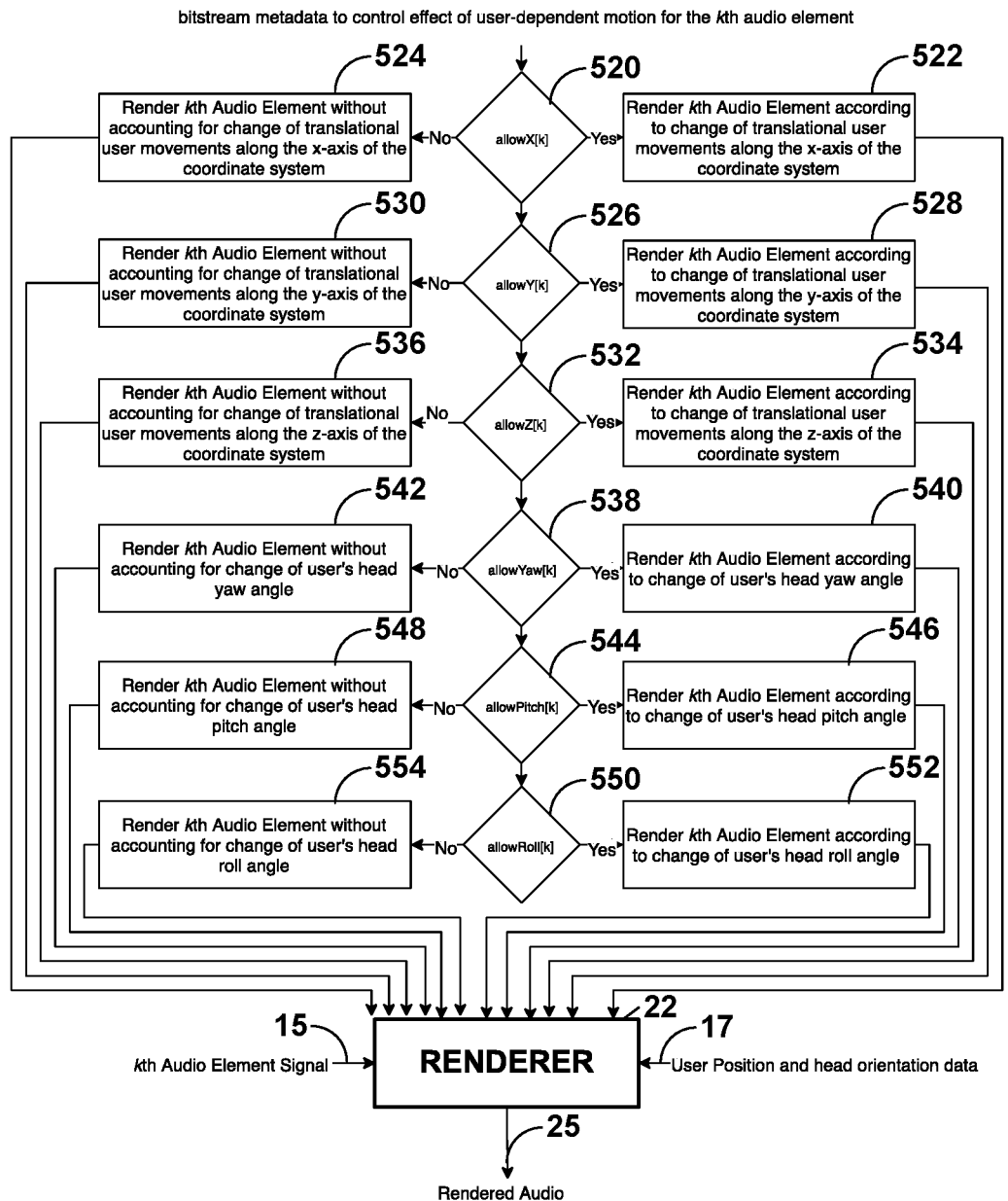

The audio playback system 16 may process the foregoing syntax elements and adapt the one of renderers 22 using the syntax elements according to the flowchart set forth in the example of FIG. 3B. FIG. 3B is a flowchart illustrating example operation of the audio playback system of FIG. 1A in performing various aspects of the controlled user based movement audio rendering techniques described int his disclosure.

In the example of FIG. 3B, the audio playback system 16 may first determine whether the allowX syntax element (which is an example of bitstream metadata that may control the effect of user-dependent motion) is either true ("Yes") or false ("No") (520). When the allowX syntax element is true ("Yes" 520), the audio playback system 16 may adapt the renderer 22 for the kth audio element according to a change of translational user movements along the x-axis of the coordinate system, thereby rendering the kth audio element according to a change of translational user movement along the x-axis of the coordinate system as indicated by the indication 17 (522). When the allowX syntax element is false ("No" 520), the audio playback system 16 may adapt the renderer 22 for the kth audio element to disregard changes in translational user movements along the x-axis of the coordinate system, thereby rendering the kth audio element without accounting for the change in translational user movement along the x-axis of the coordinate system as indicated by the indication 17 (524).

The audio playback system 16 may next determine whether the allowY syntax element (which is an example of bitstream metadata that may control the effect of user-dependent motion) is either true ("Yes") or false ("No") (526). When the allowY syntax element is true ("Yes" 526), the audio playback system 16 may adapt the renderer 22 for the kth audio element according to a change of translational user movements along the y-axis of the coordinate system, thereby rendering the kth audio element according to a change of translational user movement along the y-axis of the coordinate system as indicated by the indication 17 (528). When the allowY syntax element is false ("No" 526), the audio playback system 16 may adapt the renderer 22 for the kth audio element to disregard changes in translational user movements along the y-axis of the coordinate system, thereby rendering the kth audio element without accounting for the change in translational user movement along the y-axis of the coordinate system as indicated by the indication 17 (530).

The audio playback system 16 may next determine whether the allowZ syntax element (which is an example of bitstream metadata that may control the effect of user-dependent motion) is either true ("Yes") or false ("No") (532). When the allowZ syntax element is true ("Yes" 532), the audio playback system 16 may adapt the renderer 22 for the kth audio element according to a change of translational user movements along the z-axis of the coordinate system, thereby rendering the kth audio element according to a change of translational user movement along the z-axis of the coordinate system as indicated by the indication 17 (534). When the allowZ syntax element is false ("No" 532), the audio playback system 16 may adapt the renderer 22 for the kth audio element to disregard changes in translational user movements along the z-axis of the coordinate system, thereby rendering the kth audio element without accounting for the change in translational user movement along the z-axis of the coordinate system as indicated by the indication 17 (536).

The audio playback system 16 may next determine whether the allowYaw syntax element (which is an example of bitstream metadata that may control the effect of user-dependent motion) is either true ("Yes") or false ("No") (538). When the allowYaw syntax element is true ("Yes" 538), the audio playback system 16 may adapt the renderer 22 for the kth audio element according to a change of a head of user 402 yaw angle, thereby rendering the kth audio element according to a change of user's head yaw angle as indicated by the indication 17 (540). When the allowYaw syntax element is false ("No" 538), the audio playback system 16 may adapt the renderer 22 for the kth audio element to disregard changes in a head of user 402 yaw angle, thereby rendering the kth audio element without accounting for the change of a user's head yaw angle as indicated by the indication 17 (542).

The audio playback system 16 may next determine whether the allowPitch syntax element (which is an example of bitstream metadata that may control the effect of user-dependent motion) is either true ("Yes") or false ("No") (544). When the allowPitch syntax element is true ("Yes" 544), the audio playback system 16 may adapt the renderer 22 for the kth audio element according to a change of a head of user 402 pitch angle, thereby rendering the kth audio element according to a change of user's head pitch angle as indicated by the indication 17 (546). When the allowPitch syntax element is false ("No" 544), the audio playback system 16 may adapt the renderer 22 for the kth audio element to disregard changes in a head of user 402 pitch angle, thereby rendering the kth audio element without accounting for the change of a user's head pitch angle as indicated by the indication 17 (548).

The audio playback system 16 may next determine whether the allowRoll syntax element (which is an example of bitstream metadata that may control the effect of user-dependent motion) is either true ("Yes") or false ("No") (550). When the allowRoll syntax element is true ("Yes" 550), the audio playback system 16 may adapt the renderer 22 for the kth audio element according to a change of a head of user 402 roll angle, thereby rendering the kth audio element according to a change of user's roll yaw angle as indicated by the indication 17 (552). When the allowRoll syntax element is false ("No" 550), the audio playback system 16 may adapt the renderer 22 for the kth audio element to disregard changes in a head of user 402 roll angle, thereby rendering the kth audio element without accounting for the change of a user's head roll angle as indicated by the indication 17 (554).

To illustrate yet another example, the audio playback system 16 may obtain six degrees of freedom rendering metadata indicative of controls for enabling or disabling six degrees of freedom adaptations, based on translational movement and rotational movement of the user, of the renderer. When the six degrees of freedom rendering metadata indicates that the six degrees of freedom adaptation of the renderer is disabled, the audio playback system 16 may obtain rotational rendering metadata indicative of controls for enabling or disabling rotational adaptations, based on rotational movement of the user, of the renderer. When the rotational rendering metadata indicates that the rotational adaptation of the renderer is disabled, the audio playback system 16 may obtain one or more of:

Yaw rendering metadata indicative of controls for enabling or disabling yaw adaptations, based on yaw movement of the user of the device, of the renderer;

Pitch rendering metadata indicative of controls for enabling or disabling pitch adaptations, based on pitch movement of the user of the device, of the renderer; and Roll rendering metadata indicative of controls for enabling or disabling roll adaptations, based on roll movement of the user of the device, of the renderer.

The following syntax table provides an example of how the preceding rendering metadata may be defined within the bitstream 21.

| Syntax | No. of bits | Mnemonic |
|---|---|---|
| { | | |
|   for (k=0; k<numAudioElement; k++) { | | |
|     allow6DOF; | 1 | bslbf |
|     if (allow6DOF) { | | |
|       allowYaw[k] = true; | | |
|       allowPitch[k] = true; | | |
|       allowRoll[k] = true; | | |
|       allowX[k] = true; | | |

| Syntax | No. of bits | Mnemonic |
|---|---|---|
| ``` | | |
|         allowY[k] = true; | | |
|         allowZ[k]= true; | | |
|     } else { /*if(allow6DOF==0)*/ | | |
|         allowX[k] = false; | | |
|         allowY[k] = false; | | |
|         allowZ[k]= false; | | |
|         allowRotation; | 1 | bslbf |
|         if(allowRotation) { | | |
|             allowYaw[k] = true; | | |
|             allowPitch[k] = true; | | |
|             allowRoll[k] = true; | | |
|         }else    { | | |
| /*if(allowRotation==0)*/ | | |
|             allowYaw[k]; | 1 | bslbf |
|             allowPitch[k]; | 1 | bslbf |
|             allowRoll[k]; | 1 | bslbf |
|         } | | |
|     } | | |
|   } | | |
| } | | |

Figure 3C:
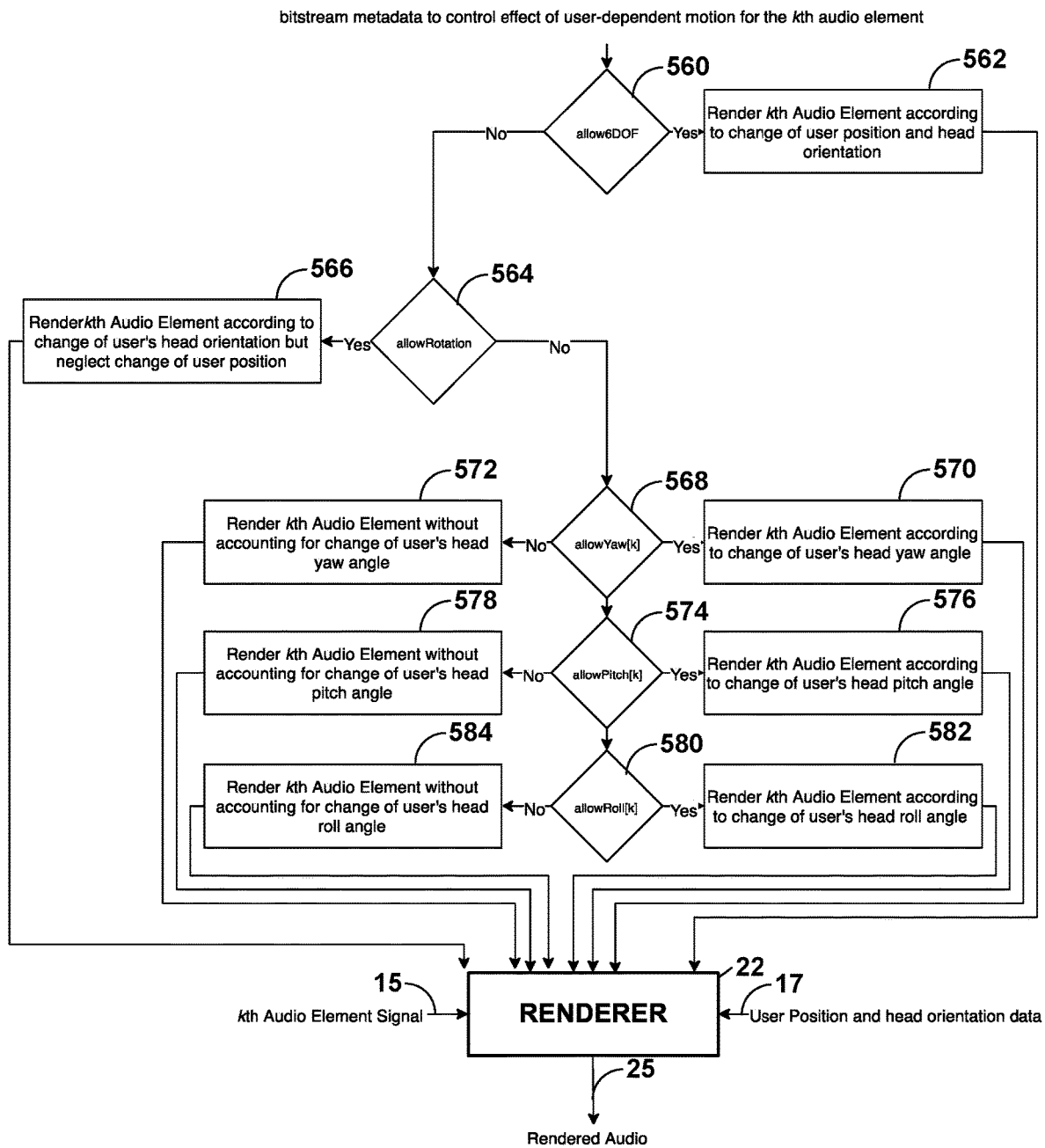

The audio playback system 16 may process the foregoing syntax elements and adapt the one of renderers 22 using the syntax elements according to the flowchart set forth in the example of FIG. 3C. FIG. 3C is a flowchart illustrating example operation of the audio playback system of FIG. 1A in performing various aspects of the controlled user based movement audio rendering techniques described int his disclosure.

In the example of FIG. 3C, the audio playback system 16 may first determine whether the allow6DOF syntax element (which is an example of bitstream metadata that may control the effect of user-dependent motion) is either true ("Yes") or false ("No") (560). When the allow6DOF syntax element is true ("Yes" 560), the audio playback system 16 may adapt the renderer 22 for the kth audio element according to a change of user position (translational movement) and head orientation (rotational movement), thereby rendering the kth audio element according to a change of user position and head orientation as indicated by the indication 17 (562).

When the allow6DOF syntax element is false ("No" 560), the audio playback system 16 may adapt the renderer 22 for the kth audio element to disregard changes in translational user movements, thereby rendering the kth audio element without accounting for the change in translational user movement along the x-axis of the coordinate system as indicated by the indication 17. Further, the audio playback system 16 may determine whether the allowRotation syntax element is either true ("Yes") or false ("No") (564).

When the allowRotation syntax element is true ("Yes" 564), the audio playback system 16 may adapt the renderer 22 for the kth audio element according to a change of user's head orientation, thereby rendering the kth audio element according to a change of user's head orientation but neglect change of user position, both of which may be indicated by the indication 17 (566). When the allowRotation syntax element is false ("No" 564), the audio playback system 16 may determine whether one or more of the allowYaw, allowPitch, and allowRoll syntax elements are true ("Yes") or false ("No") (568, 574, and 580 respectively).

The audio playback system 16 may determine whether the allowYaw syntax element (which is an example of bitstream metadata that may control the effect of user-dependent motion) is either true ("Yes") or false ("No") (568). When the allowYaw syntax element is true ("Yes" 568), the audio playback system 16 may adapt the renderer 22 for the kth audio element according to a change of a head of user 402 yaw angle, thereby rendering the kth audio element according to a change of user's head yaw angle as indicated by the indication 17 (570). When the allowYaw syntax element is false ("No" 568), the audio playback system 16 may adapt the renderer 22 for the kth audio element to disregard changes in a head of user 402 yaw angle, thereby rendering the kth audio element without accounting for the change of a user's head yaw angle as indicated by the indication 17 (572).

The audio playback system 16 may next determine whether the allowPitch syntax element (which is an example of bitstream metadata that may control the effect of user-dependent motion) is either true ("Yes") or false ("No") (574). When the allowPitch syntax element is true ("Yes" 574), the audio playback system 16 may adapt the renderer 22 for the kth audio element according to a change of a head of user 402 pitch angle, thereby rendering the kth audio element according to a change of user's head pitch angle as indicated by the indication 17 (576). When the allowPitch syntax element is false ("No" 574), the audio playback system 16 may adapt the renderer 22 for the kth audio element to disregard changes in a head of user 402 pitch angle, thereby rendering the kth audio element without accounting for the change of a user's head pitch angle as indicated by the indication 17 (578).

The audio playback system 16 may next determine whether the allowRoll syntax element (which is an example of bitstream metadata that may control the effect of user-dependent motion) is either true ("Yes") or false ("No") (580). When the allowRoll syntax element is true ("Yes" 580), the audio playback system 16 may adapt the renderer 22 for the kth audio element according to a change of a head of user 402 roll angle, thereby rendering the kth audio element according to a change of user's head roll angle as indicated by the indication 17 (582). When the allowRoll syntax element is false ("No" 580), the audio playback system 16 may adapt the renderer 22 for the kth audio element to disregard changes in a head of user 402 roll angle, thereby rendering the kth audio element without accounting for the change of a user's head roll angle as indicated by the indication 17 (584).

To illustrate yet another example, the audio playback system 16 may obtain distance rendering metadata indicative of controls for enabling or disabling distance adaptations, based on a distance between a sound source and a location of the user of the device in the soundfield as modified by the indication of the movement of the user of the device, of the one of the renderers 22. The following syntax table provides an example of how the preceding rendering metadata may be defined within the bitstream 21.

| Syntax | No. of bits | Mnemonic |
|---|---|---|
| { | | |
|     for (k=0; k<numAudioElement; k++) { | | |
|         allowDistanceRendering[k]; | 1 | bslbf |
|     } | | |
| } | | |

The foregoing syntax element allowDistanceRendering is semantically defined as follows:
AllowDistanceRendering: This flag may indicate whether the rendering of the audio element k shall account for the distance-dependent change due to user movement within the audio scene. If the flag is set to zero, no distance-dependent processing shall be applied.

Figure 3D:
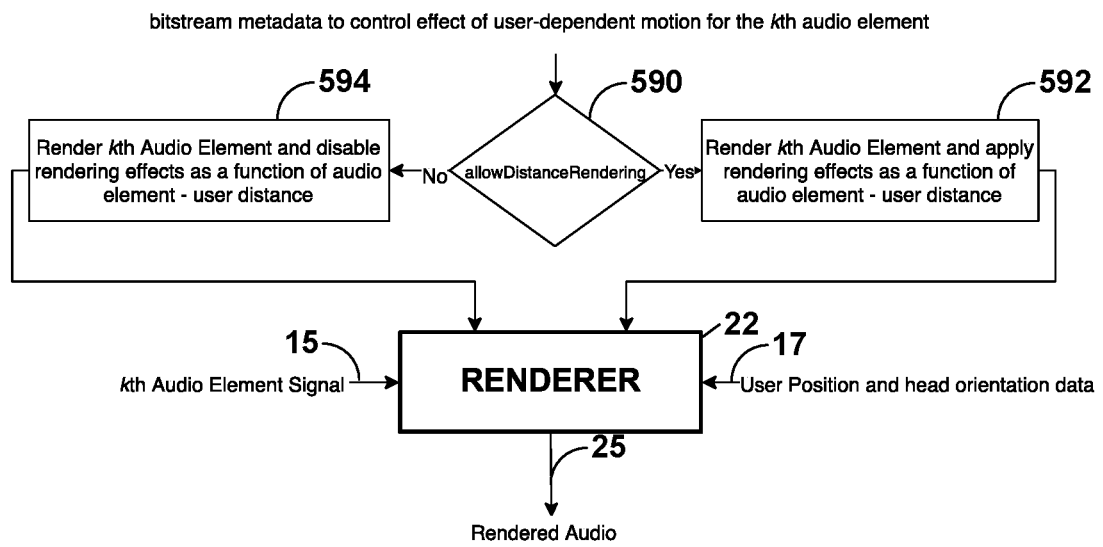

The audio playback system 16 may process the foregoing syntax element and adapt the one of renderers 22 using the syntax element according to the flowchart set forth in the example of FIG. 3D. FIG. 3D is a flowchart illustrating example operation of the audio playback system of FIG. 1A in performing various aspects of the controlled user based movement audio rendering techniques described int his disclosure.

In the example of FIG. 3D, the audio playback system 16 may first determine whether the allowDistanceRendering syntax element (which is an example of bitstream metadata that may control the effect of user-dependent motion) is either true ("Yes") or false ("No") (590). When the allowDistanceRendering syntax element is true ("Yes" 590), the audio playback system 16 may adapt the renderer 22 for the kth audio element to apply rendering effects as a function of audio element—user distance (592). When the allowDistanceRendering syntax element is false ("No" 590), the audio playback system 16 may adapt the renderer 22 for the kth audio element to disable rendering effects as a function of audio element—user distance (594).

As another example, the audio playback system 16 may obtain doppler effect metadata indicative of controls for enabling or disabling doppler adaptations, based on a speed of the user in a virtual environment presented to the user, of the one of the renderers 22. The following syntax table provides an example of how the preceding rendering metadata may be defined within the bitstream 21.

| Syntax | No. of bits | Mnemonic |
|---|---|---|
| { | | |
|     for (k=0; k<numAudioElement; k++) { | | |
|         allowDopplerFxRendering[k]; | 1 | bslbf |
|     } | | |
| } | | |

The foregoing syntax element allowDopplerFxRendering is semantically defined as follows:
allowDopplerFxRendering: This flag may indicate whether the rendering of the audio element k shall be processed with Doppler Effect due to fast user movements within the audio scene. If the flag is set to zero, no Doppler effect processing shall be applied.

Figure 3E:
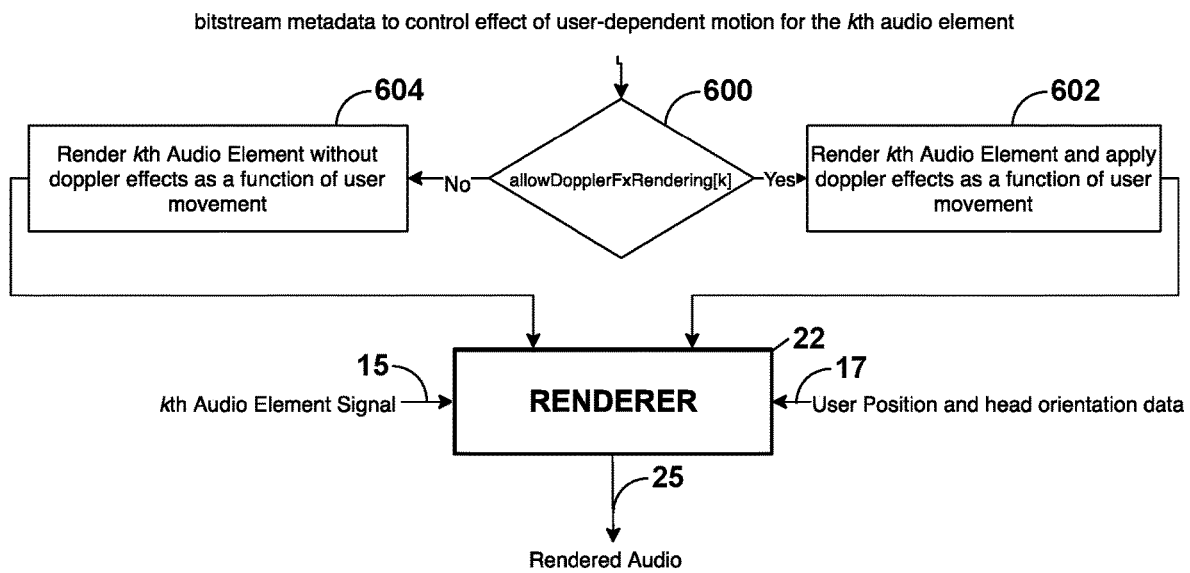

The audio playback system 16 may process the foregoing syntax element and adapt the one of renderers 22 using the syntax element according to the flowchart set forth in the example of FIG. 3E. FIG. 3E is a flowchart illustrating example operation of the audio playback system of FIG. 1A in performing various aspects of the controlled user based movement audio rendering techniques described int his disclosure.

In the example of FIG. 3E, the audio playback system 16 may first determine whether the allowDopplerFxRendering syntax element (which is an example of bitstream metadata that may control the effect of user-dependent motion) is either true ("Yes") or false ("No") (600). When the allowDopplerFxRendering syntax element is true ("Yes" 600), the audio playback system 16 may adapt the renderer 22 for the kth audio element to apply doppler effects as a function of user movement (602). When the allowDopplerFxRendering syntax element is false ("No" 600), the audio playback system 16 may adapt the renderer 22 for the kth audio element to disable doppler effects as a function of user movement (604), i.e., render without doppler effects as a function of user movement as one example.

As yet another example, the audio playback system 16 may obtain delay metadata indicative of controls for enabling or disabling delay adaptations of the renderer that adjust a speed with which movement of the user results in adaptations to the one of the renderers 22. The delay metadata may represent a parameter in the bitstream 21 that signals whether the motion tracker sensor data (e.g., the indication 17) should be processed as soon as possible (which may be the default) or with a specific delay and/or with a maximum speed. Such delay and speed reduction may be used by the content creator to achieve certain artistic effects, e.g., to create a 6DOF experience where the user's perception was altered/impaired (such as being submersed in water, etc.).

Figure 3F:
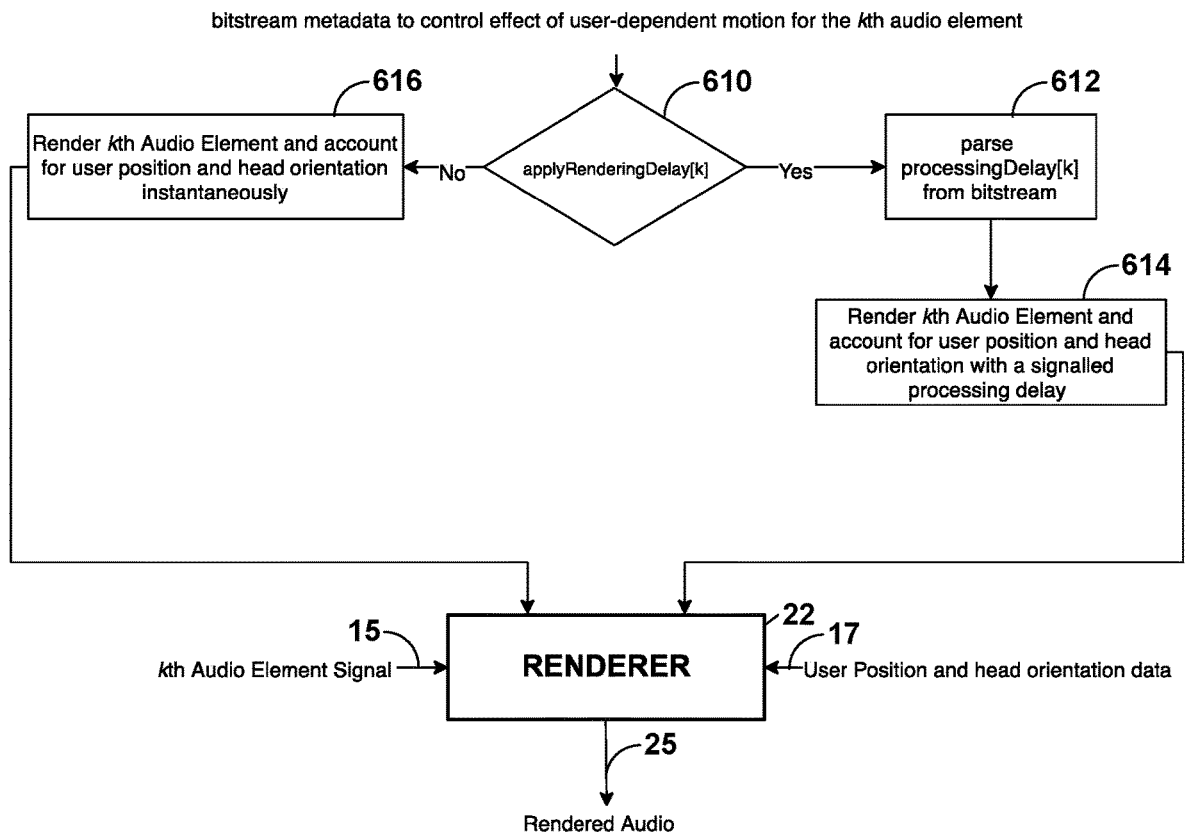

The audio playback system 16 may process the foregoing syntax element and adapt the one of renderers 22 using the syntax element according to the flowchart set forth in the example of FIG. 3F. FIG. 3F is a flowchart illustrating example operation of the audio playback system of FIG. 1A in performing various aspects of the controlled user based movement audio rendering techniques described int his disclosure.

In the example of FIG. 3F, the audio playback system 16 may first determine whether the allowRenderingDelay syntax element (which is an example of bitstream metadata that may control the effect of user-dependent motion) is either true ("Yes") or false ("No") (610). When the allowRenderingDelay syntax element is true ("Yes" 610), the audio playback system 16 may parse a processingDelay syntax element from the bitstream 21 (which may be indicative of the rendering delay) (612) and adapt the renderer 22 to render the kth audio element to account for user position and head orientation (as indicated by the indication 17) with the signaled processing delay defined by the processingDelay syntax element (614). When the allowRenderingDelay syntax element is false ("No" 610), the audio playback system 16 may adapt the renderer 22 to render the kth audio element to account for user position and head orientation (as indicated by the indication 17) instantaneously (or, in other words, as soon as possible—meaning as soon as processing resources are available) (616).

As another example, the audio playback system 16 may obtain translational threshold metadata indicative of controls for enabling or disabling application of a translational threshold when performing translation adaptions, based on translation movement of the user, with respect to the one of the renderers 22. That is, the translational threshold metadata may represent a parameter in the bitstream 21 that signals if the motion tracker sensor data (e.g., the indication 17) shall be processed only once a certain amount of movement was detected. The translational threshold metadata may present rendering of micromovements and motion tracker jitter that may not be desired by the content creator and/or user. The translational threshold metadata may facilitate conservation of power by reducing rendering processing cycles from being expended to update audio rendering based on user movement.

The following syntax table provides an example of how the preceding rendering metadata may be defined within the bitstream 21.

| Syntax | No. of bits | Mnemonic |
|---|---|---|
| { | | |
|     for (k=0; k<numAudioElement; k++) { | | |
|         translationRenderingThreshold[k]; | 8 | uimsbf |

| Syntax | No. of bits | Mnemonic |
|---|---|---|
| } | | |
| } | | |

Figure 3G:
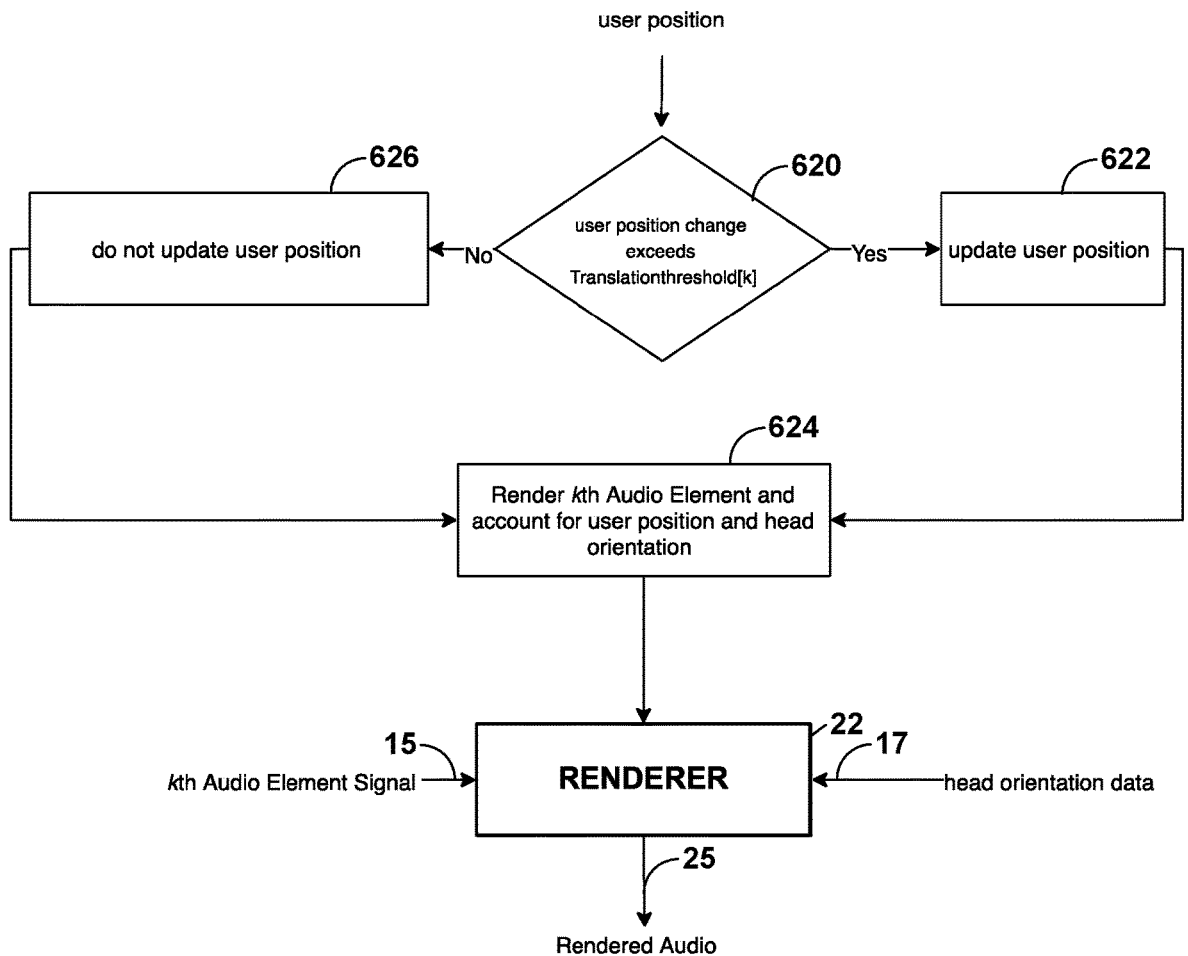

The audio playback system 16 may process the foregoing syntax element and adapt the one of renderers 22 using the syntax element according to the flowchart set forth in the example of FIG. 3G. FIG. 3G is a flowchart illustrating example operation of the audio playback system 16 of FIG. 1A in performing various aspects of the controlled user based movement audio rendering techniques described int his disclosure.

In the example of FIG. 3G, the audio playback system 16 may first determine whether the user position (e.g., as indicated by the indication 17) change exceeds the translation threshold defined by the translationRenderingThreshold syntax element (which is an example of bitstream metadata that may control the effect of user-dependent motion) (620). When the user position exceeds the translation threshold ("Yes" 620), the audio playback system 16 may update the user position (622) and adapt the renderer 22 for the kth audio element to account for the updated user position and head orientation as indicated by the indication 17 (624). When the user position is equal to or below the translation threshold ("No" 620), the audio playback system 16 does not update the user position (626) and adapts the renderer 22 for the kth audio element to account for the previous user position and head orientation as indicated by the indication 17 (624).

As noted above, the renderer 22 referenced throughout this disclosure may refer to a rendering digital signal processor (DSP) process (or, in other words, a DSP configured to perform a rendering process), a dedicated application specific integrated circuit (ASIC) that performs an adaptable rendering process, a graphics processing unit (GPU) configured to perform a rendering process, a central processing unit (CPU) configured to perform a rendering process, and/or any processor, hardware, fixed logic circuitry, etc. capable of being configured to perform various aspects of the techniques described in this disclosure.

In this respect, as shown in FIG. 3G, the audio playback system 16, via the rendering DSP process, may apply the obtained one of the renderers 22 to the audio data 15 to generate the speaker feeds 25 based potentially on various aspects of the location 17. The audio playback system 16 may output the speaker feeds 25 to the speakers 3, which may reproduce, based on the speaker feeds 25, the soundfield.

FIG. 1B is a block diagram illustrating another example system 100 configured to perform various aspects of the techniques described in this disclosure. The system 100 is similar to the system 10 shown in FIG. 1A, except that the audio renderers 22 shown in FIG. 1A are replaced with a binaural renderer 102 capable of performing binaural rendering using one or more head-related transfer functions HRTFs or the other functions capable of rendering to left and right speaker feeds 103.

The audio playback system 16 may output the left and right speaker feeds 103 to headphones 104, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 104 may couple wirelessly or via wired connection to the additional wearable devices.

Additionally, the headphones 104 may couple to the audio playback system 16 via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 104 may recreate, based on the left and right speaker feeds 103, the soundfield represented by the audio data 11. The headphones 104 may include a left headphone speaker and a right headphone speaker which are powered (or, in other words, driven) by the corresponding left and right speaker feeds 103.

Figure 4:
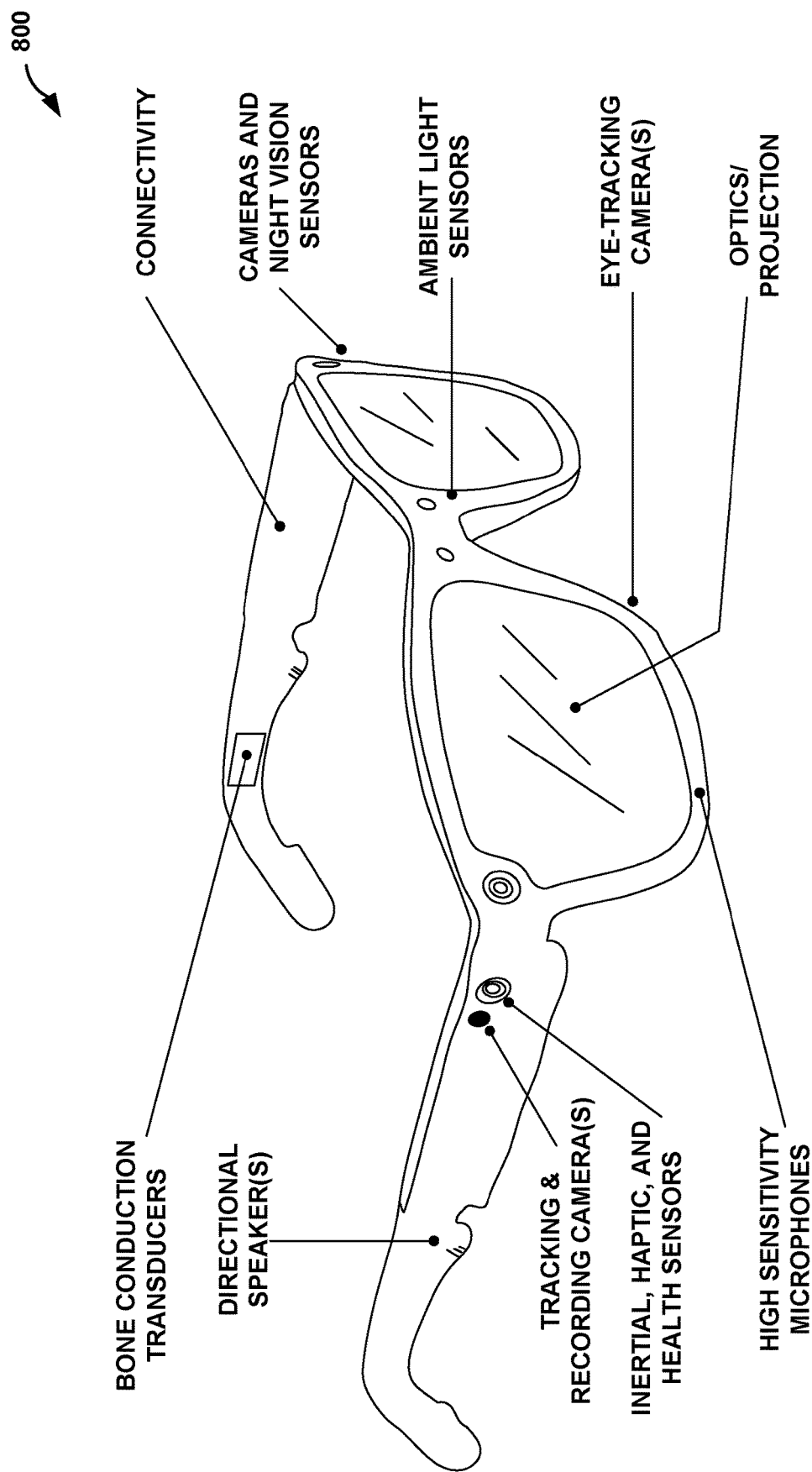
FIG. 4 is a diagram illustrating an example of a wearable device that may operate in accordance with various aspect of the techniques described in this disclosure.

FIG. 4 is a diagram illustrating an example of a wearable device 800 that may operate in accordance with various aspect of the techniques described in this disclosure. In various examples, the wearable device 800 may represent a VR headset (such as the VR headset 400 described above), an AR headset, an MR headset, or an extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may refer to a catchall term for VR, AR, and MR. More information regarding terminology for XR can be found in a document by Jason Peterson, entitled "Virtual Reality, Augmented Reality, and Mixed Reality Definitions, " and dated Jul. 7, 2017.

The wearable device 800 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 800 may communicate with the computing device supporting the wearable device 800 via a wired connection or a wireless connection.

In some instances, the computing device supporting the wearable device 800 may be integrated within the wearable device 800 and as such, the wearable device 800 may be considered as the same device as the computing device supporting the wearable device 800. In other instances, the wearable device 800 may communicate with a separate computing device that may support the wearable device 800. In this respect, the term "supporting" should not be understood to require a separate dedicated device but that one or more processors configured to perform various aspects of the techniques described in this disclosure may be integrated within the wearable device 800 or integrated within a computing device separate from the wearable device 800.

For example, when the wearable device 800 represents the VR device 400, a separate dedicated computing device (such as a personal computer including the one or more processors) may render the audio and visual content, while the wearable device 800 may determine the translational head movement upon which the dedicated computing device may render, based on the translational head movement, the audio content (as the speaker feeds) in accordance with various aspects of the techniques described in this disclosure. As another example, when the wearable device 800 represents smart glasses, the wearable device 800 may include the one or more processors that both determine the translational head movement (by interfacing within one or more sensors of the wearable device 800) and render, based on the determined translational head movement, the speaker feeds.

As shown, the wearable device 800 includes a rear camera, one or more directional speakers, one or more tracking and/or recording cameras, and one or more light-emitting diode (LED) lights. In some examples, the LED light(s) may be referred to as "ultra bright" LED light(s). In addition, the wearable device 800 includes one or more eye-tracking cameras, high sensitivity audio microphones, and optics/projection hardware. The optics/projection hardware of the wearable device 800 may include durable semi-transparent display technology and hardware.

The wearable device 800 also includes connectivity hardware, which may represent one or more network interfaces that support multimode connectivity, such as 4G communications, 5G communications, etc. The wearable device 800 also includes ambient light sensors, and bone conduction transducers. In some instances, the wearable device 800 may also include one or more passive and/or active cameras with fisheye lenses and/or telephoto lenses. Various devices of this disclosure, such as the content consumer device 14 of FIG. 1A may use the steering angle of the wearable device 800 to select an audio representation of a soundfield (e.g., one of MOA representations) to output via the directional speaker(s)—headphones 404—of the wearable device 800, in accordance with various techniques of this disclosure. It will be appreciated that the wearable device 800 may exhibit a variety of different form factors.

Furthermore, the tracking and recording cameras and other sensors may facilitate the determination of translational distance. Although not shown in the example of FIG. 4, wearable device 800 may include other types of sensors for detecting translational distance.

Although described with respect to particular examples of wearable devices, such as the VR device 400 discussed above with respect to the examples of FIG. 2 and other devices set forth in the examples of FIGS. 1A and 1B, a person of ordinary skill in the art would appreciate that descriptions related to FIGS. 1A, 1B, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 5A:
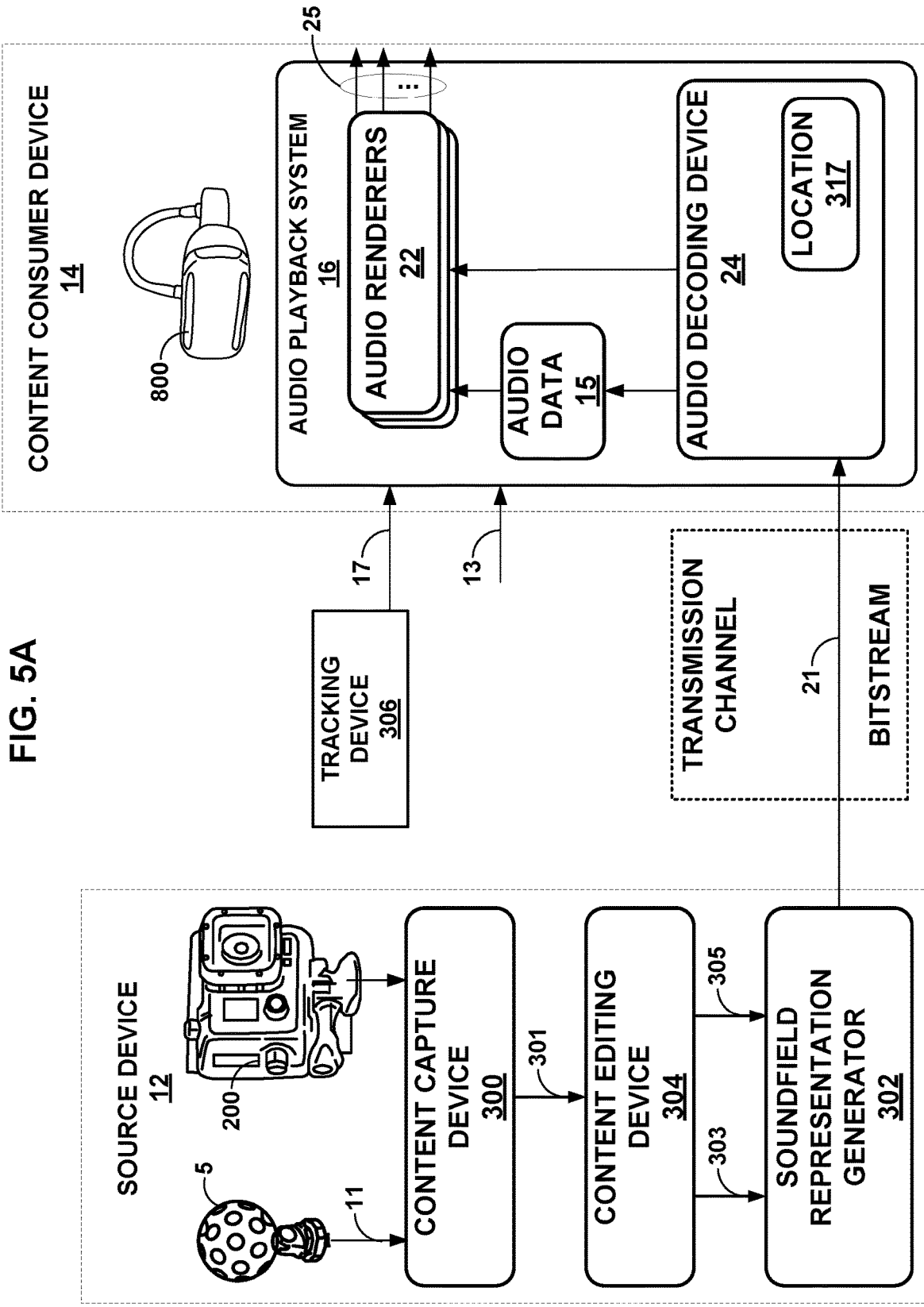
FIGS. 5A and 5B are diagrams illustrating other example systems that may perform various aspects of the techniques described in this disclosure.
Figure 5B:
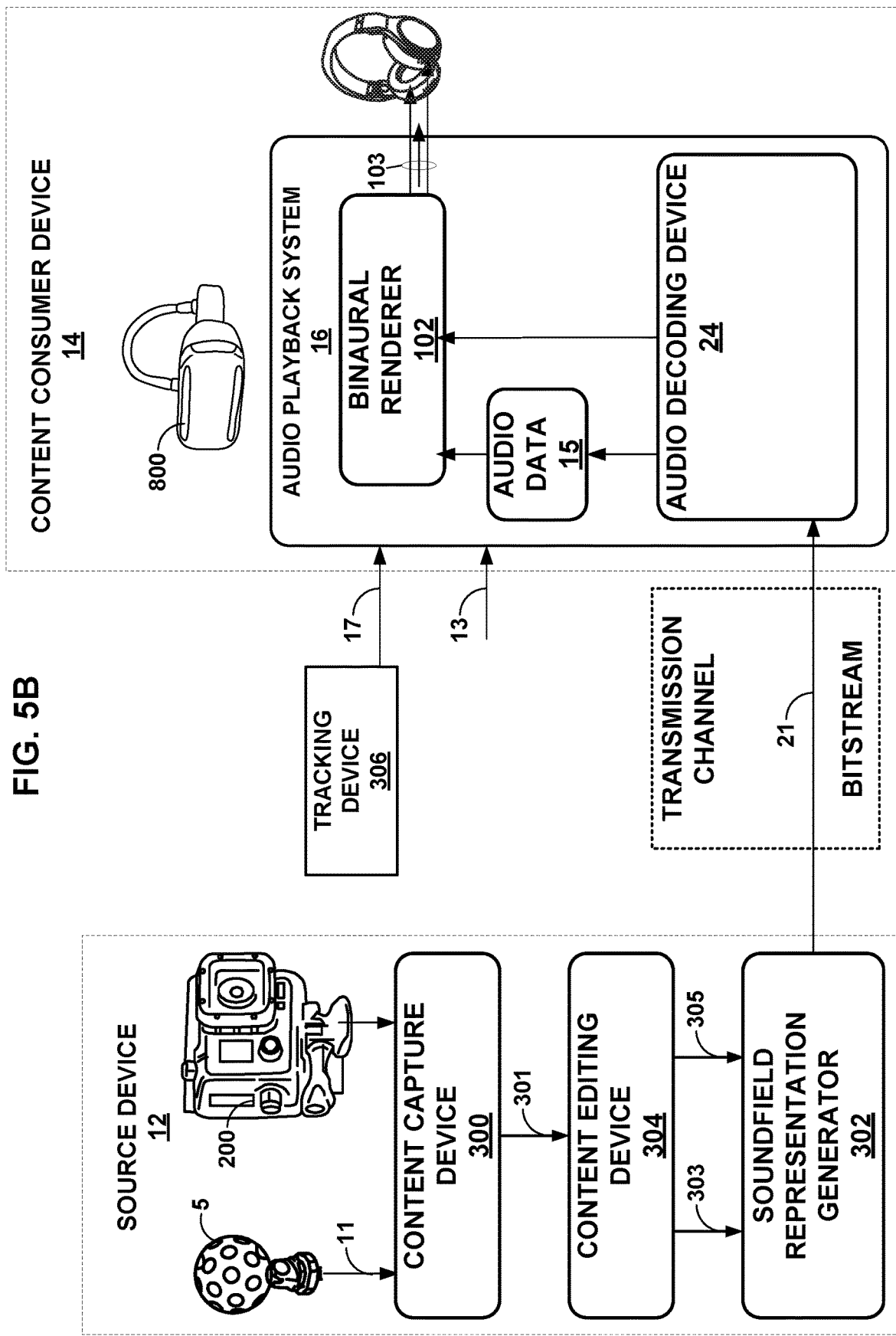

FIGS. 5A and 5B are diagrams illustrating example systems that may perform various aspects of the techniques described in this disclosure. FIG. 5A illustrates an example in which the source device 12 further includes a camera 200. The camera 200 may be configured to capture video data, and provide the captured raw video data to the content capture device 300. The content capture device 300 may provide the video data to another component of the source device 12, for further processing into viewport-divided portions.

In the example of FIG. 5A, the content consumer device 14 also includes the wearable device 800. It will be understood that, in various implementations, the wearable device 800 may be included in, or externally coupled to, the content consumer device 14. The wearable device 800 includes display hardware and speaker hardware for outputting video data (e.g., as associated with various viewports) and for rendering audio data.

FIG. 5B illustrates an example in which the audio renderers 22 shown in FIG. 5A are replaced with a binaural renderer 102 capable of performing binaural rendering using one or more HRTFs or the other functions capable of rendering to left and right speaker feeds 103. The audio playback system 16 may output the left and right speaker feeds 103 to headphones 104.

The headphones 104 may couple to the audio playback system 16 via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 104 may recreate, based on the left and right speaker feeds 103, the soundfield represented by the audio data 11. The headphones 104 may include a left headphone speaker and a right headphone speaker which are powered (or, in other words, driven) by the corresponding left and right speaker feeds 103.

Figure 6:
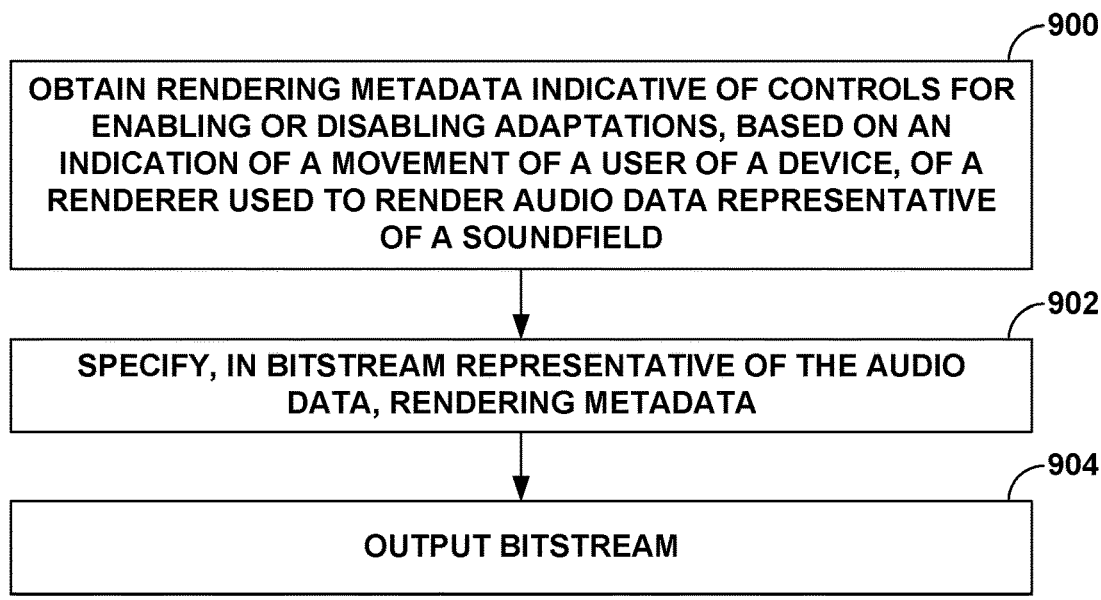
FIG. 6 is a flowchart illustrating example operation of the source device of FIG. 1A in performing various aspects of the techniques described in this disclosure.

FIG. 6 is a flowchart illustrating example operation of the source device of FIG. 1A in performing various aspects of the techniques described in this disclosure. The source device 12 may obtain rendering metadata indicative of controls for enabling or disabling adaptations, based on an indication of a movement of a user of a device, of a renderer (e.g., one or more of audio renderers 22) used to render the audio data 15 representative of a soundfield (900). In some examples, the soundfield representation generator 302 may obtain the rendering metadata indicative of the controls for enabling or disabling adaptations, based on the indication of movement of the user 402 of the VR headset 400, to the audio renderer 22 used to render the audio data 15.

The soundfield representation generator 302 may, in some instances, receive the rendering metadata from the content editing device 304 as part of the metadata 305. As such, the rendering metadata may be referred to as "rendering metadata 305." In this instance, an audio editor or other operator of the source device 12 may specify the rendering metadata 305 via the content editing device 304. In some instances, the soundfield representation generator 302 may programmatically generate the rendering metadata 305 possibly based on the content 303 or other types of metadata 305. In any event, the soundfield representation generator 302 may specify, in the bitstream 21 representative of the audio data 11, the rendering metadata 305, and output the bitstream 21 (902, 904).

Figure 7:
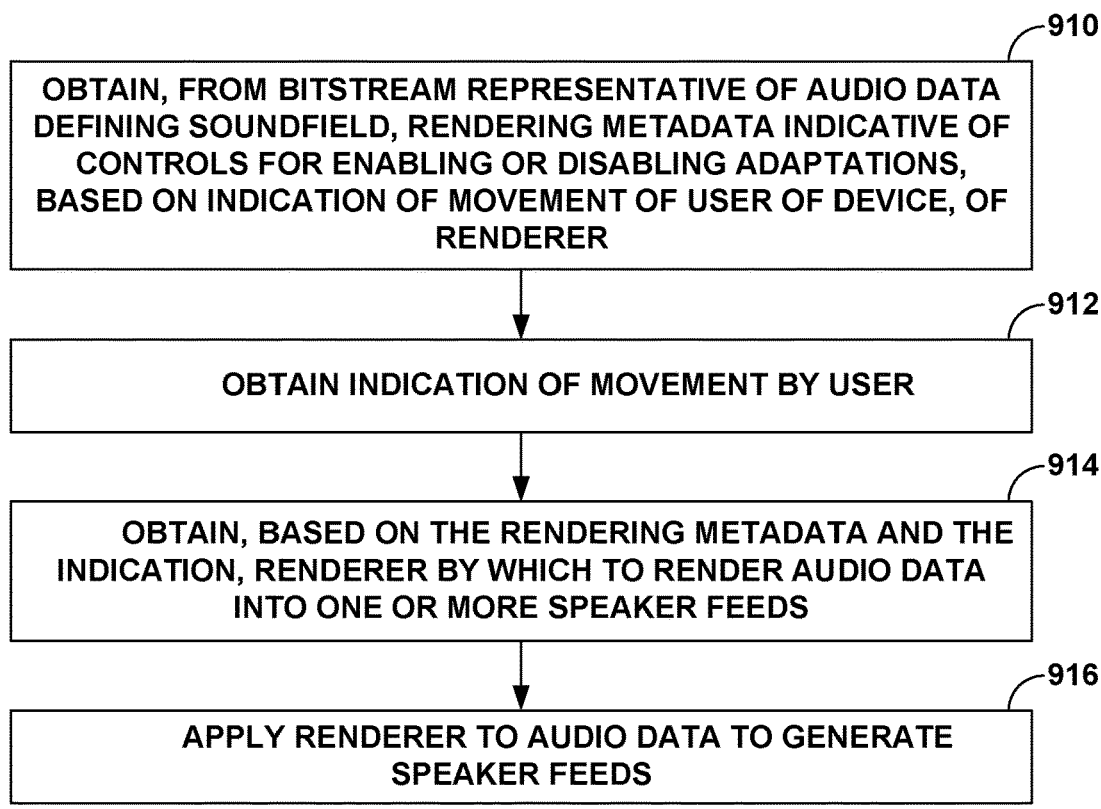
FIG. 7 is a flowchart illustrating example operation of the audio playback system of FIG. 1A in performing various aspects of the techniques described in this disclosure.

FIG. 7 is a flowchart illustrating example operation of the audio playback system of FIG. 1A in performing various aspects of the techniques described in this disclosure. The audio decoding device 24 of the audio playback system 16 may obtain, from the bitstream 21 representative of audio data 15, the rendering metadata 305 (which is indicative of controls for enabling or disabling adaptations, based on indication of movement of a user of a device, of renderer 22) (910). The audio playback system 16 may obtain an indication 17 of the movement of the user 402 via a tracking device 306 (912).

The audio playback system 16 may obtain the indication 17, and obtain, based on the rendering metadata 305 and the indication 17, one of the renderers 22 by which to render the audio data 15 into the speaker feeds 25 (914). The rendering metadata 305 may, as noted above, include one or more indications of controls for enabling or disabling adaptations of the one of the renderers 22 based on the indication 17 of the movement of the user 402 of the VR headset 402. The audio playback system 16 may apply the one of renderers 22 to audio data 15 to generate speaker feeds 25 (916).

In this way, various aspects of the techniques described in this disclosure may enable one or more of example clauses that follow.

Clause 1A. A device comprising: a memory configured to store audio data representative of a soundfield; and one or more processors coupled to the memory, and configured to: obtain, from a bitstream representative of the audio data, rendering metadata indicative of controls for enabling or disabling adaptations, based on an indication of a movement of a user of the device, of a renderer; obtain the indication of the movement of the user; obtain, based on the rendering metadata and the indication, a renderer by which to render the audio data into one or more speaker feeds; and apply the renderer to the audio data to generate the speaker feeds.

Clause 2A. The device of clause 1A, wherein the one or more processors are configured to obtain translational rendering metadata indicative of controls for enabling or disabling translational adaptations, based on translational movement of the user, of the renderer.

Clause 3A. The device of any combination of clauses 1A and 2A, wherein the one or more processors are configured to obtain rotational rendering metadata indicative of controls for enabling or disabling rotational adaptations, based on rotational movement of the user, of the renderer.

Clause 4A. The device of any combination of clauses 1A-3A, wherein the one or more processors are configured to obtain one or more of: six degrees of freedom rendering metadata indicative of controls for enabling or disabling six degrees of freedom adaptations, based on translational movement and rotational movement of the user, of the renderer; three degrees of freedom plus rendering metadata indicative of controls for enabling or disabling three degrees of freedom adaptations, based on translational movement of a head of the user and rotational movement of the user, of the renderer; or three degrees of freedom rendering metadata indicative of controls for enabling or disabling three degrees of freedom adaptations, based on rotational movement of the user, of the renderer.

Clause 5A. The device of any combination of clauses 1A-4A, wherein the one or more processors are configured to obtain one or more of: x-axis rendering metadata indicative of controls for enabling or disabling x-axis adaptations, based on x-axis movement of the user of the device, of the renderer; y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer; yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 6A. The device of any combination of clauses 1A-5A, wherein the one or more processors are configured to: obtain six degrees of freedom rendering metadata indicative of controls for enabling or disabling six degrees of freedom adaptations, based on translational movement and rotational movement of the user, of the renderer; obtain, when the six degrees of freedom rendering metadata indicates that the six degrees of freedom adaptation of the renderer is disabled, rotational rendering metadata indicative of controls for enabling or disabling rotational adaptation, based on rotational movement of the user, of the renderer; and obtain, when the rotational rendering metadata indicates that the rotational adaptations of the renderer is disabled, one or more of: yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 7A. The device of any combination of clauses 1A-6A, wherein the one or more processors are configured to obtain distance rendering metadata indicative of controls for enabling or disabling distance adaptations, based on a distance between a sound source and a location of the user of the device in the soundfield as modified by the indication of the movement of the user of the device, of the renderer.

Clause 8A. The device of any combination of clauses 1A-7A, wherein the one or more processors are configured to obtain doppler effect metadata indicative of controls for enabling or disabling doppler adaptations, based on a speed of the user in a virtual environment presented to the user, of the renderer.

Clause 9A. The device of any combination of clauses 1A-8A, wherein the one or more processors are configured to obtain delay metadata indicative of controls for enabling or disabling delay adaptations of the renderer that adjust a speed with which movement of the user results in adaptations to the render.

Clause 10A. The device of any combination of clauses 1A-9A, wherein the one or more processors are configured to obtain translational threshold metadata indicative of controls for enabling or disabling application of a translational threshold when performing translation adaptions, based on translation movement of the user, with respect to the renderer.

Clause 11A. The device of any combination of clauses 1A-10A, wherein the device includes a virtual reality headset coupled to one or more speakers configured to reproduce, based on the speaker feeds, the soundfield.

Clause 12A. The device of any combination of clauses 1A-10A, wherein the device includes an augmented reality headset coupled to one or more speakers configured to reproduce, based on the speaker feeds, the soundfield.

Clause 13A. The device of any combination of clauses 1A-10A, wherein the device further includes one or more speakers configured to reproduce, based on the speaker feeds, the soundfield.

Clause 14A. A method comprising: obtaining, from a bitstream representative of audio data defining a soundfield, rendering metadata indicative of controls for enabling or disabling adaptations, based on an indication of a movement of a user of a device, of a renderer; obtaining the indication of the movement by the user; obtaining, based on the rendering metadata and the indication, a renderer by which to render the audio data into one or more speaker feeds; and applying the renderer to the audio data to generate the speaker feeds.

Clause 15A. The method of clause 14A, wherein obtaining the rendering metadata comprises obtaining translational rendering metadata indicative of controls for enabling or disabling translational adaptations, based on translational movement of the user, of the renderer.

Clause 16A. The method of any combination of clauses 14A and 15A, wherein obtaining the rendering metadata comprises obtaining rotational rendering metadata indicative of controls for enabling or disabling rotational adaptations, based on rotational movement of the user, of the renderer.

Clause 17A. The method of any combination of clauses 14A-16A, wherein obtaining the rendering metadata comprises obtaining one or more of: six degrees of freedom rendering metadata indicative of controls for enabling or disabling six degrees of freedom adaptations, based on translational movement and rotational movement of the user, of the renderer; three degrees of freedom plus rendering metadata indicative of controls for enabling or disabling three degrees of freedom adaptations, based on translational movement of a head of the user and rotational movement of the user, of the renderer; or three degrees of freedom rendering metadata indicative of controls for enabling or disabling three degrees of freedom adaptations, based on rotational movement of the user, of the renderer.

Clause 18A. The method of any combination of clauses 14A-17A, wherein obtaining the rendering metadata comprises obtaining one or more of: x-axis rendering metadata indicative of controls for enabling or disabling x-axis adaptations, based on x-axis movement of the user of the device, of the renderer; y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer; yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 19A. The method of any combination of clauses 14A-18A, wherein obtaining the rendering metadata comprises: obtaining six degrees of freedom rendering metadata indicative of controls for enabling or disabling six degrees of freedom adaptations, based on translational movement and rotational movement of the user, of the renderer; obtaining, when the six degrees of freedom rendering metadata indicates that the six degrees of freedom adaptation of the renderer is disabled, rotational rendering metadata indicative of controls for enabling or disabling rotational adaptation, based on rotational movement of the user, of the renderer; and obtaining, when the rotational rendering metadata indicates that the rotational adaptations of the renderer is disabled, one or more of: yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 20A. The method of any combination of clauses 14A-19A, wherein obtaining the rendering metadata comprises obtaining distance rendering metadata indicative of controls for enabling or disabling distance adaptations, based on a distance between a sound source and a location of the user of the device in the soundfield as modified by the indication of the movement of the user of the device, of the renderer.

Clause 21A. The method of any combination of clauses 14A-20A, wherein obtaining the rendering metadata comprises obtaining doppler effect metadata indicative of controls for enabling or disabling doppler adaptations, based on a speed of the user in a virtual environment presented to the user, of the renderer.

Clause 22A. The method of any combination of clauses 14A-21A, wherein obtaining the rendering metadata comprises obtaining delay metadata indicative of controls for enabling or disabling delay adaptations of the renderer that adjust a speed with which movement of the user results in adaptations to the render.

Clause 23A. The method of any combination of clauses 14A-22A, wherein obtaining the rendering metadata comprises obtaining translational threshold metadata indicative of controls for enabling or disabling application of a translational threshold when performing translation adaptions, based on translation movement of the user, with respect to the renderer.

Clause 24A. The method of any combination of clauses 14A-23A, wherein a device performs the method, the device further including a virtual reality headset coupled to one or more speakers configured to reproduce, based on the speaker feeds, the soundfield.

Clause 25A. The method of any combination of clauses 14A-23A, wherein a device performs the method, the device including an augmented reality headset coupled to one or more speakers configured to reproduce, based on the speaker feeds, the soundfield.

Clause 26A. The method of any combination of clauses 14A-23A, wherein a device performs the method, the device further including one or more speakers configured to reproduce, based on the speaker feeds, the soundfield.

Clause 27A. A device comprising: means for obtaining, from a bitstream representative of audio data defining a soundfield, rendering metadata indicative of controls for enabling or disabling adaptations, based on an indication of a movement of a user of the device, of a renderer; means for obtaining the indication of the movement by the user; means for obtaining, based on the rendering metadata and the indication, a renderer by which to render the audio data into one or more speaker feeds; and means for applying the renderer to the audio data to generate the speaker feeds.

Clause 28A. The device of clause 27A, wherein the means for obtaining the rendering metadata comprises means for obtaining translational rendering metadata indicative of controls for enabling or disabling translational adaptations, based on translational movement of the user, of the renderer.

Clause 29A. The device of any combination of clauses 27A and 28A, wherein the means for obtaining the rendering metadata comprises means for obtaining rotational rendering metadata indicative of controls for enabling or disabling rotational adaptations, based on rotational movement of the user, of the renderer.

Clause 30A. The device of any combination of clauses 27A-29A, wherein the means for obtaining the rendering metadata comprises means for obtaining one or more of: six degrees of freedom rendering metadata indicative of controls for enabling or disabling six degrees of freedom adaptations, based on translational movement and rotational movement of the user, of the renderer; three degrees of freedom plus rendering metadata indicative of controls for enabling or disabling three degrees of freedom adaptations, based on translational movement of a head of the user and rotational movement of the user, of the renderer; or three degrees of freedom rendering metadata indicative of controls for enabling or disabling three degrees of freedom adaptations, based on rotational movement of the user, of the renderer.

Clause 31A. The device of any combination of clauses 27A-30A, wherein the means for obtaining the rendering metadata comprises means for obtaining one or more of: x-axis rendering metadata indicative of controls for enabling or disabling x-axis adaptations, based on x-axis movement of the user of the device, of the renderer; y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer; yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 32A. The device of any combination of clauses 27A-31A, wherein the means for obtaining the rendering metadata comprises: means for obtaining six degrees of freedom rendering metadata indicative of controls for enabling or disabling six degrees of freedom adaptations, based on translational movement and rotational movement of the user, of the renderer; means for obtaining, when the six degrees of freedom rendering metadata indicates that the six degrees of freedom adaptation of the renderer is disabled, rotational rendering metadata indicative of controls for enabling or disabling rotational adaptation, based on rotational movement of the user, of the renderer; and means for obtaining, when the rotational rendering metadata indicates that the rotational adaptations of the renderer is disabled, one or more of: yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 33A. The device of any combination of clauses 27A-32A, wherein the means for obtaining the rendering metadata comprises means for obtaining distance rendering metadata indicative of controls for enabling or disabling distance adaptations, based on a distance between a sound source and a location of the user of the device in the soundfield as modified by the indication of the movement of the user of the device, of the renderer.

Clause 34A. The device of any combination of clauses 27A-33A, wherein the means for obtaining the rendering metadata comprises means for obtaining doppler effect metadata indicative of controls for enabling or disabling doppler adaptations, based on a speed of the user in a virtual environment presented to the user, of the renderer.

Clause 35A. The device of any combination of clauses 27A-34A, wherein the means for obtaining the rendering metadata comprises means for obtaining delay metadata indicative of controls for enabling or disabling delay adaptations of the renderer that adjust a speed with which movement of the user results in adaptations to the render.

Clause 36A. The device of any combination of clauses 27A-35A, wherein the means for obtaining the rendering metadata comprises means for obtaining translational threshold metadata indicative of controls for enabling or disabling application of a translational threshold when performing translation adaptions, based on translation movement of the user, with respect to the renderer.

Clause 37A. The device of any combination of clauses 27A-36A, wherein the device includes a virtual reality headset coupled to one or more speakers configured to reproduce, based on the speaker feeds, the soundfield.

Clause 38A. The device of any combination of clauses 27A-36A, wherein the device includes an augmented reality headset coupled to one or more speakers configured to reproduce, based on the speaker feeds, the soundfield.

Clause 39A. The device of any combination of clauses 27A-36A, wherein the device further includes one or more speakers configured to reproduce, based on the speaker feeds, the soundfield.

Clause 40A. A non-transitory computer-readable storage medium having stored thereon instructions that, when executed, cause one or more processors of a device to: obtain, from a bitstream representative of audio data defining a soundfield, rendering metadata indicative of controls for enabling or disabling adaptations, based on an indication of a movement of a user of the device, of a renderer; obtain the indication of the movement by the user; obtain, based on the rendering metadata and the indication, a renderer by which to render the audio data into one or more speaker feeds; and apply the renderer to the audio data to generate the speaker feeds.

Clause 1B. A device comprising: a memory configured to store audio data representative of a soundfield; and one or more processors coupled to the memory, and configured to: obtain rendering metadata indicative of controls for enabling or disabling adaptations, based on an indication of a movement of a user of the device, of a renderer used to render audio data representative of a soundfield; specify, in a bitstream representative of the audio data, the rendering metadata; and output the bitstream.

Clause 2B. The device of clause 1B, wherein the one or more processors are configured to obtain translational rendering metadata indicative of controls for enable or disabling translational adaptations, based on translational movement of the user, of the renderer.

Clause 3B. The device of any combination of clauses 1B and 2B, wherein the one or more processors are configured to obtain rotational rendering metadata indicative of controls for enabling or disabling rotational adaptations, based on rotational movement of the user, of the renderer.

Clause 4B. The device of any combination of clauses 1B-3B, wherein the one or more processors are configured to obtain one or more of: six degrees of freedom rendering metadata indicative of controls for enabling or disabling six degrees of freedom adaptations, based on translational movement and rotational movement of the user, of the renderer; three degrees of freedom plus rendering metadata indicative of controls for enabling or disabling three degrees of freedom adaptations, based on translation movement of a head of the user and rotational movement of the user, of the renderer; or three degrees of freedom rendering metadata indicative of controls for enabling or disabling three degrees of freedom adaptations, based on rotational movement of the user, of the renderer.

Clause 5B. The device of any combination of clauses 1B-4B, wherein the one or more processors are configured to obtain one or more of: x-axis rendering metadata indicative of controls for enabling or disabling x-axis adaptations, based on x-axis movement of the user of the device, of the renderer; y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer; yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 6B. The device of any combination of clauses 1B-5B, wherein the one or more processors are configured to: obtain six degrees of freedom rendering metadata indicative of controls for enabling or disabling six degrees of freedom adaptations, based on translational movement and rotational movement of the user, of the renderer; obtain, when the six degrees of freedom rendering metadata indicates that the six degrees of freedom adaptation of the renderer is disabled, rotational rendering metadata indicative of controls for enable or disabling rotational adaptations, based on rotational movement of the user, of the renderer; and obtain, when the rotational rendering metadata indicates that the rotational adaptation of the renderer is disabled, one or more of: yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 7B. The device of any combination of clauses 1B-6B, wherein the one or more processors are configured to obtain distance rendering metadata indicative of controls for enabling or disabling distance adaptations, based on a distance between a sound source and the location of the device within the soundfield, of the renderer.

Clause 8B. The device of any combination of clauses 1B-7B, wherein the one or more processors are configured to obtain doppler effect metadata indicative of controls for enabling or disabling doppler adaptations, based on a speed of the user in a virtual environment presented to the user, of the renderer.

Clause 9B. The device of any combination of clauses 1B-8B, wherein the one or more processors are configured to obtain delay metadata indicative of controls for enabling or disabling delay adaptations of the renderer that adjust a speed with which movement of the user results in adaptations to the render.

Clause 10B. The device of any combination of clauses 1B-9B, wherein the one or more processors are configured to obtain translational threshold metadata indicative of controls for enabling or disabling application of a translational threshold when performing translation adaptions, based on translation movement of the user, with respect to the renderer.

Clause 11B. A method comprising: obtaining rendering metadata indicative of controls for enabling or disabling adaptations, based on an indication of a movement of a user of a device, of a renderer used to render audio data representative of a soundfield; specifying, in a bitstream representative of the audio data, the rendering metadata; and outputting the bitstream.

Clause 12B. The method of clause 11B, wherein obtaining the rendering metadata comprises obtaining translational rendering metadata indicative of controls for enable or disabling translational adaptations, based on translational movement of the user, of the renderer.

Clause 13B. The method of any combination of clauses 11B and 12B, wherein obtaining the rendering metadata comprises obtaining rotational rendering metadata indicative of controls for enabling or disabling rotational adaptations, based on rotational movement of the user, of the renderer.

Clause 14B. The method of any combination of clauses 11B-13B, wherein obtaining the rendering metadata comprises obtaining one or more of: six degrees of freedom rendering metadata indicative of controls for enabling or disabling six degrees of freedom adaptations, based on translational movement and rotational movement of the user, of the renderer; three degrees of freedom plus rendering metadata indicative of controls for enabling or disabling three degrees of freedom adaptations, based on translation movement of a head of the user and rotational movement of the user, of the renderer; or three degrees of freedom rendering metadata indicative of controls for enabling or disabling three degrees of freedom adaptations, based on rotational movement of the user, of the renderer.

Clause 15B. The method of any combination of clauses 11B-14B, wherein obtaining the rendering metadata comprises obtaining one or more of: x-axis rendering metadata indicative of controls for enabling or disabling x-axis adaptations, based on x-axis movement of the user of the device, of the renderer; y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer; yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 16B. The method of any combination of clauses 11B-15B, wherein obtaining the rendering metadata comprises: obtaining six degrees of freedom rendering metadata indicative of controls for enabling or disabling six degrees of freedom adaptations, based on translational movement and rotational movement of the user, of the renderer; obtaining, when the six degrees of freedom rendering metadata indicates that the six degrees of freedom adaptation of the renderer is disabled, rotational rendering metadata indicative of controls for enable or disabling rotational adaptations, based on rotational movement of the user, of the renderer; and obtaining, when the rotational rendering metadata indicates that the rotational adaptation of the renderer is disabled, one or more of: yaw rendering metadata indicative of controls for enabling or disabling yaw adaptations, based on yaw movement of the user of the device, of the renderer;

pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 17B. The method of any combination of clauses 11B-16B, wherein obtaining the rendering metadata comprises obtaining distance rendering metadata indicative of controls for enabling or disabling distance adaptations, based on a distance between a sound source and the location of the device within the soundfield, of the renderer.

Clause 18B. The method of any combination of clauses 11B-17B, wherein obtaining the rendering metadata comprises obtaining doppler effect metadata indicative of controls for enabling or disabling doppler adaptations, based on a speed of the user in a virtual environment presented to the user, of the renderer.

Clause 19B. The method of any combination of clauses 11B-18B, wherein obtaining the rendering metadata comprises obtaining delay metadata indicative of controls for enabling or disabling delay adaptations of the renderer that adjust a speed with which movement of the user results in adaptations to the render.

Clause 20B. The method of any combination of clauses 11B-19B, wherein obtaining the rendering metadata comprises obtaining translational threshold metadata indicative of controls for enabling or disabling application of a translational threshold when performing translation adaptions, based on translation movement of the user, with respect to the renderer.

Clause 21B. A device comprising: means for obtaining rendering metadata indicative of controls for enabling or disabling adaptations, based on an indication of a movement of a user of the device, of a renderer used to render audio data representative of a soundfield; means for specifying, in a bitstream representative of the audio data, the rendering metadata; and means for outputting the bitstream.

Clause 22B. The device of clause 21B, wherein the means for obtaining the rendering metadata comprises means for obtaining translational rendering metadata indicative of controls for enable or disabling translational adaptations, based on translational movement of the user, of the renderer.

Clause 23B. The device of any combination of clauses 21B and 22B, wherein the means for obtaining the rendering metadata comprises means for obtaining rotational rendering metadata indicative of controls for enabling or disabling rotational adaptations, based on rotational movement of the user, of the renderer.

Clause 24B. The device of any combination of clauses 21B-23B, wherein the means for obtaining the rendering metadata comprises means for obtaining one or more of: six degrees of freedom rendering metadata indicative of controls for enabling or disabling six degrees of freedom adaptations, based on translational movement and rotational movement of the user, of the renderer; three degrees of freedom plus rendering metadata indicative of controls for enabling or disabling three degrees of freedom adaptations, based on translation movement of a head of the user and rotational movement of the user, of the renderer; or three degrees of freedom rendering metadata indicative of controls for enabling or disabling three degrees of freedom adaptations, based on rotational movement of the user, of the renderer.

Clause 25B. The device of any combination of clauses 21B-24B, wherein the means for obtaining the rendering metadata comprises means for obtaining one or more of: x-axis rendering metadata indicative of controls for enabling or disabling x-axis adaptations, based on x-axis movement of the user of the device, of the renderer; y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer; yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 26B. The device of any combination of clauses 21B-25B, wherein the means for obtaining the rendering metadata comprises: means for obtaining six degrees of freedom rendering metadata indicative of controls for enabling or disabling six degrees of freedom adaptations, based on translational movement and rotational movement of the user, of the renderer; means for obtaining, when the six degrees of freedom rendering metadata indicates that the six degrees of freedom adaptation of the renderer is disabled, rotational rendering metadata indicative of controls for enable or disabling rotational adaptations, based on rotational movement of the user, of the renderer; and means for obtaining, when the rotational rendering metadata indicates that the rotational adaptation of the renderer is disabled, one or more of: yaw rendering metadata indicative of controls for enabling or disabling yaw adaptations, based on yaw movement of the user of the device, of the renderer; pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

Clause 27B. The device of any combination of clauses 21B-26B, wherein the means for obtaining the rendering metadata comprises means for obtaining distance rendering metadata indicative of controls for enabling or disabling distance adaptations, based on a distance between a sound source and the location of the device within the soundfield, of the renderer.

Clause 28B. The device of any combination of clauses 21B-27B, wherein the means for obtaining the rendering metadata comprises means for obtaining doppler effect metadata indicative of controls for enabling or disabling doppler adaptations, based on a speed of the user in a virtual environment presented to the user, of the renderer.

Clause 29B. The device of any combination of clauses 21B-28B, wherein the means for obtaining the rendering metadata comprises means for obtaining delay metadata indicative of controls for enabling or disabling delay adaptations of the renderer that adjust a speed with which movement of the user results in adaptations to the render.

Clause 30B. The device of any combination of clauses 21B-29B, wherein the means for obtaining the rendering metadata comprises means for obtaining translational threshold metadata indicative of controls for enabling or disabling application of a translational threshold when performing translation adaptions, based on translation movement of the user, with respect to the renderer.

Clause 31B. A non-transitory computer-readable storage medium having stored thereon instructions that, when executed, cause one or more processors of a device to: obtain rendering metadata indicative of controls for enabling or disabling adaptations, based on an indication of a movement of a user of the device, of a renderer used to render audio data representative of a soundfield; specify, in a bitstream representative of the audio data, the rendering metadata; and output the bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
a memory configured to store audio data representative of a soundfield; and
one or more processors coupled to the memory, and configured to:
obtain, from a bitstream representative of the audio data, rendering metadata indicative of controls for enabling or disabling adaptations, based on an indication of a movement of a user of the device
obtain the indication of the movement of the user;

obtain delay metadata indicative of controls for enabling or disabling delay adaptations of the renderer that adjust a speed with which movement of the user results in adaptations to the render;

obtain a renderer, by which to render the audio data into one or more speaker feeds, based on the rendering metadata, the delay metadata, and the indication; and apply the renderer to the audio data to generate the speaker feeds.

2. The device of claim 1, wherein the one or more processors are configured to obtain translational rendering metadata indicative of controls for enabling or disabling translational adaptations, based on translational movement of the user, of the renderer.

3. The device of claim 1, wherein the one or more processors are configured to obtain rotational rendering metadata indicative of controls for enabling or disabling rotational adaptations, based on rotational movement of the user, of the renderer.

4. The device of claim 1, wherein the one or more processors are configured to obtain one or more of:

six degrees of freedom rendering metadata indicative of controls for enabling or disabling six degrees of freedom adaptations, based on translational movement and rotational movement of the user, of the renderer;

three degrees of freedom plus rendering metadata indicative of controls for enabling or disabling three degrees of freedom adaptations, based on translational movement of a head of the user and rotational movement of the user, of the renderer; or three degrees of freedom rendering metadata indicative of controls for enabling or disabling three degrees of freedom adaptations, based on rotational movement of the user, of the renderer.

5. The device of claim 1, wherein the one or more processors are configured to obtain one or more of:

x-axis rendering metadata indicative of controls for enabling or disabling x-axis adaptations, based on x-axis movement of the user of the device, of the renderer;

y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer;

yaw rendering metadata indicative of controls for enabling or disabling yaw adaptations, based on yaw movement of the user of the device, of the renderer;

pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

6. The device of claim 1, wherein the one or more processors are configured to obtain distance rendering metadata indicative of controls for enabling or disabling distance adaptations, based on a distance between a sound source and a location of the user of the device in the soundfield as modified by the indication of the movement of the user of the device, of the renderer.

7. The device of claim 1, wherein the one or more processors are configured to obtain translational threshold metadata indicative of controls for enabling or disabling application of a translational threshold when performing translation adaptions, based on translation movement of the user, with respect to the renderer.

8. The device of claim 1, wherein the device includes a virtual reality headset coupled to one or more speakers configured to reproduce, based on the speaker feeds, the soundfield.

9. The device of claim 1, wherein the device includes an augmented reality headset coupled to one or more speakers configured to reproduce, based on the speaker feeds, the soundfield.

10. The device of claim 1, wherein the device further includes one or more speakers configured to reproduce, based on the speaker feeds, the soundfield.

11. A device comprising:

a memory configured to store audio data representative of a soundfield; and one or more processors coupled to the memory, and configured to:

obtain rendering metadata indicative of controls for enabling or disabling adaptations, based on an indication of a movement of a user of the device, of a renderer used to render audio data representative of a soundfield;

obtain delay metadata, of the renderer, indicative of controls for enabling or disabling doppler adaptations, based on a speed of the user in a virtual environment presented to the user;

specify, in a bitstream representative of the audio data, the rendering metadata and the delay metadata; and output the bitstream.

12. The device of claim 11, wherein the one or more processors are configured to obtain translational rendering metadata indicative of controls for enable or disabling translational adaptations, based on translational movement of the user, of the renderer.

13. The device of claim 11, wherein the one or more processors are configured to obtain rotational rendering metadata indicative of controls for enabling or disabling rotational adaptations, based on rotational movement of the user, of the renderer.

14. The device of claim 11, wherein the one or more processors are configured to obtain one or more of:

six degrees of freedom rendering metadata indicative of controls for enabling or disabling six degrees of freedom adaptations, based on translational movement and rotational movement of the user, of the renderer;

three degrees of freedom plus rendering metadata indicative of controls for enabling or disabling three degrees of freedom adaptations, based on translation movement of a head of the user and rotational movement of the user, of the renderer; or three degrees of freedom rendering metadata indicative of controls for enabling or disabling three degrees of freedom adaptations, based on rotational movement of the user, of the renderer.

15. The device of claim 11, wherein the one or more processors are configured to obtain one or more of:

x-axis rendering metadata indicative of controls for enabling or disabling x-axis adaptations, based on x-axis movement of the user of the device, of the renderer;

y-axis rendering metadata indicative of controls for enabling or disabling y-axis adaptations, based on y-axis movement of the user of the device, of the renderer; and z-axis rendering metadata indicative of controls for enabling or disabling z-axis adaptations, based on z-axis movement of the user of the device, of the renderer;

yaw rendering metadata indicative of controls for enabling or disabling yaw adaptations, based on yaw movement of the user of the device, of the renderer;

pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer.

16. The device of claim 11, wherein the one or more processors are configured to obtain distance rendering metadata indicative of controls for enabling or disabling distance adaptations, based on a distance between a sound source and the location of the device within the soundfield, of the renderer.

17. The device of claim 11, wherein the one or more processors are configured to obtain translational threshold metadata indicative of controls for enabling or disabling application of a translational threshold when performing translation adaptions, based on translation movement of the user, with respect to the renderer.

18. A device comprising:
a memory configured to store audio data representative of a soundfield; and
one or more processors coupled to the memory, and configured to:
obtain, from a bitstream representative of the audio data, rendering metadata indicative of controls for enabling or disabling adaptations, based on an indication of a movement of a user of the device;
obtain the indication of the movement of the user;
obtain doppler effect metadata indicative of controls for enabling or disabling doppler adaptations, based on a speed of the user in a virtual environment presented to the user;
obtain a renderer, by which to render the audio data into one or more speaker feeds, based on the rendering metadata, the doppler effect metadata, and the indication; and
apply the renderer to the audio data to generate the speaker feeds.

19. A device comprising:
a memory configured to store audio data representative of a soundfield; and
one or more processors coupled to the memory, and configured to:
obtain, from a bitstream representative of the audio data, rendering metadata indicative of controls for enabling or disabling adaptations, based on an indication of a movement of a user of the device;
obtain the indication of the movement of the user;
obtain six degrees of freedom rendering metadata indicative of controls for enabling or disabling six degrees of freedom adaptations, based on translational movement and rotational movement of the user, of the renderer;
obtain, when the six degrees of freedom rendering metadata indicates that the six degrees of freedom adaptation of the renderer is disabled, rotational rendering metadata indicative of controls for enabling or disabling rotational adaptation, based on rotational movement of the user, of the renderer; and
obtain, when the rotational rendering metadata indicates that the rotational adaptations of the renderer is disabled, one or more of:
yaw rendering metadata indicative of controls for enabling or disabling yaw adaptations, based on yaw movement of the user of the device, of the renderer;
pitch rendering metadata indicative of controls for enabling or disabling pitch adaptations, based on pitch movement of the user of the device, of the renderer; and
roll rendering metadata indicative of controls for enabling or disabling roll adaptations, based on roll movement of the user of the device, of the renderer;
obtain a renderer, by which to render the audio data into one or more speaker feeds, based on the rendering metadata, the six degrees of freedom rendering metadata, and the indication; and
apply the renderer to the audio data to generate the speaker feeds.

20. A device comprising:
a memory configured to store audio data representative of a soundfield; and
one or more processors coupled to the memory, and configured to:
obtain rendering metadata indicative of controls for enabling or disabling adaptations, based on an indication of a movement of a user of the device, of a renderer used to render audio data representative of a soundfield;
obtain doppler effect rendering metadata, of the renderer, indicative of controls for enabling or disabling doppler adaptations, based on a speed of the user in a virtual environment presented to the user, of the renderer;
specify, in a bitstream representative of the audio data, the rendering metadata and the doppler effect rendering metadata; and
output the bitstream.

21. A device comprising:
a memory configured to store audio data representative of a soundfield; and
one or more processors coupled to the memory, and configured to:
obtain rendering metadata indicative of controls for enabling or disabling adaptations, based on an indication of a movement of a user of the device, of a renderer used to render audio data representative of a soundfield;
obtain six degrees of freedom rendering metadata, of the renderer, indicative of controls for enabling or disabling six degrees of freedom adaptations, based on translational movement and rotational movement of the user, of the renderer;
obtain, when the six degrees of freedom rendering metadata indicates that the six degrees of freedom adaptation of the renderer is disabled, rotational rendering metadata indicative of controls for enable or disabling rotational adaptations, based on rotational movement of the user, of the renderer; and
obtain, when the rotational rendering metadata indicates that the rotational adaptation of the renderer is disabled, one or more of:
yaw rendering metadata indicative of controls for enabling or disabling yaw adaptations, based on yaw movement of the user of the device, of the renderer;
pitch rendering metadata indicative of controls for enabling or disabling pitch adaptations, based on pitch movement of the user of the device, of the renderer; and roll rendering metadata indicative of controls for enabling or disabling roll adaptations, based on roll movement of the user of the device, of the renderer;
specify, in a bitstream representative of the audio data, the rendering data and the six degrees of freedom rendering metadata; and
output the bitstream.

\* \* \* \* \*